US011289716B2

(12) United States Patent
Zhang et al.

(10) Patent No.: US 11,289,716 B2
(45) Date of Patent: Mar. 29, 2022

(54) BIPOLAR PLATE, FUEL CELL STACK WITH BIPOLAR PLATE AND POWER GENERATION SYSTEM WITH BIPOLAR PLATE

(71) Applicants: Guosheng Zhang, Beijing (CN); Zhijin Zhang, Beijing (CN); Ruiping Niu, Beijing (CN); Wenming Zhang, Jiaozuo (CN)

(72) Inventors: Guosheng Zhang, Beijing (CN); Zhijin Zhang, Beijing (CN)

(73) Assignees: Guosheng Zhang, Beijing (CN); Zhijin Zhang, Beijing (CN); Rulping Niu, Beijing (CN); Wenming Zhang, Jiaozuo (CN)

( * ) Notice: Subject to any disclaimer, the term of this patent is extended or adjusted under 35 U.S.C. 154(b) by 160 days.

(21) Appl. No.: 16/856,062

(22) Filed: Apr. 23, 2020

(65) Prior Publication Data
US 2020/0365913 A1 Nov. 19, 2020

(30) Foreign Application Priority Data

May 16, 2019 (CN) .......................... 201910409135.6
Sep. 10, 2019 (CN) .......................... 201910851949.5

(51) Int. Cl.
*H01M 8/026* (2016.01)
*H01M 8/0267* (2016.01)

(52) U.S. Cl.
CPC ......... *H01M 8/026* (2013.01); *H01M 8/0267* (2013.01); *H01M 2250/20* (2013.01)

(58) Field of Classification Search
CPC ............... H01M 8/026; H01M 8/0267; H01M 2250/20; H01M 8/0263; H01M 8/0258
See application file for complete search history.

(56) References Cited

U.S. PATENT DOCUMENTS

| 2009/0029228 A1* | 1/2009 | Shibata | ................. H01M 8/026 429/402 |
| 2009/0136823 A1* | 5/2009 | Kusakabe | ........... H01M 8/0263 429/434 |

(Continued)

FOREIGN PATENT DOCUMENTS

| CN | 1643718 A | 7/2005 |
| CN | 1745489 A | 3/2006 |

(Continued)

*Primary Examiner* — Stewart A Fraser
(74) *Attorney, Agent, or Firm* — Bayramoglu Law Offices LLC

(57) ABSTRACT

A bipolar plate, a fuel cell stack with the bipolar plate and a power generation system with the bipolar plate are provided. The bipolar plate includes a first polar plate and a second polar plate. The first polar plate includes a first side and a second side, and the second polar plate includes a third side and a fourth side. The first side of the first polar plate and the third side of the second polar plate have different flow fields. The bipolar plate further includes at least one synchronous undulation areas, which are the channels for the coolant to be introduced into and discharged out of the interlayer of the bipolar plate. The second polar plate is provided with a coolant diversion dike, which can guide the coolant to flow according to the preset route.

17 Claims, 20 Drawing Sheets

(56) References Cited

U.S. PATENT DOCUMENTS

| | | | |
|---|---|---|---|
| 2009/0226788 A1* | 9/2009 | Krings | H01M 8/026 429/413 |
| 2010/0261087 A1* | 10/2010 | Shirvanian | H01M 8/2457 429/457 |
| 2011/0136042 A1* | 6/2011 | Chen | H01M 8/0258 429/514 |
| 2019/0214658 A1 | 7/2019 | Zhang et al. | |

FOREIGN PATENT DOCUMENTS

| | | |
|---|---|---|
| CN | 104813527 A | 7/2015 |
| CN | 106169595 A | 11/2016 |
| CN | 108172857 A | 6/2018 |
| CN | 108511774 A | 9/2018 |

* cited by examiner

BIPOLAR PLATE, FUEL CELL STACK WITH BIPOLAR PLATE AND POWER GENERATION SYSTEM WITH BIPOLAR PLATE

CROSS REFERENCE TO THE RELATED APPLICATIONS

This application is based upon and claims priority to Chinese Patent Applications No. 201910409135.6, filed on May 16, 2019, and No. 201910851949.5, filed on Sep. 10, 2019, the entire contents of which are incorporated herein by reference.

TECHNICAL FIELD

The present invention belongs to the technical field of fuel cells, and more particularly, to a bipolar plate used in a fuel cell stack, a fuel cell stack with a bipolar plate and a power generation system with a bipolar plate.

BACKGROUND

Fuel cells are an electrochemical reaction device that can convert chemical energy into electrical energy. Fuel cells have advantages of high energy conversion efficiency, zero emission and no mechanical noise. Fuel cells are thus especially prevalent in military and civilian application. Proton exchange membrane fuel cells (PEMFC) use solid polymer membranes as the electrolyte and have a simple structure and function at low working temperatures. PEMFC are thus particularly suitable as a mobile power supply. Renowned international automobile companies such as Toyota Motor Corporation and Hyundai Motor Company have developed mass-produced fuel cell electric vehicles (FCEV or FCV) powered by PEMFC.

Each PEMFC single cell includes two polar plates (an anode plate and a cathode plate) and a membrane electrode assembly sandwiched between the two polar plates. The anode plate of the PEMFC is provided with a fuel flow channel for the flow and transfer of the fuel, through which the fuel is transported to the anode catalyst. The cathode plate of the PEMFC is provided with an oxidant flow channel for the flow and transfer of the oxidant (oxygen or air), through which the oxidant reaches the cathode catalyst. By means of the fuel flow channel and the oxidant flow channel, the fuel and the oxidant can be continuously transported into the fuel cell so that the fuel cell can continuously output electrical energy.

In order to improve the total power of the fuel cell, a plurality of single cells are usually connected in series to form a fuel cell stack. In the fuel cell stack, except for the outermost two single cells, the anode plate of any single cell inside the stack is closely attached to the cathode plate of the adjacent single cell. The anode and cathode plates that are closely attached together are fixedly connected to form a single component, which can simplify the structure of the fuel cell stack and improve its operation and reliability. The single component formed by fixedly connecting the anode plate and the cathode plate is regarded as a bipolar plate.

The bipolar plate is a key component of fuel cell stack, which is responsible for supporting membrane electrode assembly, distributing reaction gas, transmitting current, conducting heat and discharging water produced during operation. Under the current technical state of the prior art, the manufacturing cost of bipolar plates accounts for 40-50% of the total manufacturing cost of the entire fuel cell stack.

Many types of fuel flow channels and oxidant flow channels can be used on the bipolar plate. At present, the straight-through flow channel, and the serpentine flow channel composed of a plurality of parallel channels are commonly used. The straight-through flow channel has a simple structure and low flow resistance, but the power generated from the fuel cell stack using the straight-through flow channel is sensitive to the fluctuation of gas pressure. The serpentine flow channel composed of the plurality of parallel channels, however, tolerates a relatively large pressure drop, which facilitates gas diffusing to the gas diffusion layer and the electrode catalyst, but locating the serpentine flow channel on the cathode side of PEMFC is not conducive to the discharge of the water produced. In the prior art, the fuel flow channel on the anode plate and the oxidant flow channel on the cathode plate typically employ the same type of flow channels, that is, they use either two serpentine flow channels or two straight-through flow channels. As a result, it is difficult to adjust the pressure drop of hydrogen and the pressure drop of air (or oxygen) to the optimal value at the same time because the fluidity of hydrogen is better than the fluidity of air and oxygen, when the pressure drop of hydrogen reaches the optimal value on the anode side of the PEMFC, the pressure drop of air or oxygen on the cathode side of the PEMFC is inevitably larger than its optimal value, which will lead to an increase in parasitic power and retard drainage.

In our previous research work, both the cathode plate and the anode plate of the bipolar plate were designed into serpentine flow field polar plates and have the same shape (see Chinese patent No. 201810373488.0 and U.S. patent Ser. No. 16/231,950), which are hereby incorporated by reference, can save one set of stamping dies and thus reduce the manufacturing cost of the bipolar plate. Water drainage of the patented bipolar plates, however, is not perfect because the fluidity of air is worse than the fluidity of hydrogen. Therefore, there is a need for an improved bipolar plate.

SUMMARY

One object of the present invention is to provide a bipolar plate, wherein the anode plate and the cathode plate have different flow fields, so that the pressure drop of hydrogen on the anode side of the PEMFC and the pressure drop of air (or oxygen) on the cathode side of the PEMFC can be adjusted to the optimal values concurrently, and perfect drainage can be achieved on the cathode side of the PEMFC.

Another object of the present invention is to provide a fuel cell stack and a power generation system including the aforementioned bipolar plate, which have many advantages such as high power generation efficiency, good drainage, easily controllable temperature and the like, and have a wide application prospect.

The present invention provides the following technical solutions.

A bipolar plate includes a first polar plate and a second polar plate. The first polar plate includes a first side and a second side, and the second polar plate includes a third side and a fourth side. The first side of the first polar plate is provided with a first flow channel and a first reference plane, and the third side of the second polar plate is provided with a third flow channel and a third reference plane. The first flow channel is a groove formed in a thickness direction relative to the first reference plane, and the third flow channel is a groove formed in the thickness direction relative to the third reference plane. The second side of the first polar plate is provided with a second flow channel and a second reference plane, and the fourth side of the second polar plate is provided with a fourth flow channel and a fourth reference plane. The second flow channel is a groove formed in the thickness direction relative to the second reference plane, and the fourth flow channel is a groove formed in the thickness direction relative to the fourth reference plane. The thickness direction is parallel to a stacking direction of the bipolar plate in a fuel cell stack. In the bipolar plate, the second side of the first polar plate is attached to the fourth side of the second polar plate and a part of the second reference plane is in contact with a part of the fourth reference plane. The first flow channel on the first side of the first polar plate includes a U-shaped segment, and the third flow channel on the third side of the second polar plate does not include the U-shaped segment. The U-shaped segment includes a first segment, a second segment and a third segment. In the fuel cell stack, an angle formed between a flow direction of a fluid in the first segment and a flow direction of the fluid in the third segment ranges from 150 degrees to 180 degrees, an angle formed between the flow direction of the fluid in the first segment and a flow direction of the fluid in the second segment ranges from 60 degrees to 120 degrees, and an angle formed between the flow direction of the fluid in the second segment and the flow direction of the fluid in the third segment ranges from 60 degrees to 120 degrees.

The bipolar plate includes a synchronous undulation area. The synchronous undulation area is a region on the bipolar plate, and a part of the second flow channel, a part of the second reference plane, a part of the fourth flow channel and a part of the fourth reference plane are located in the synchronous undulation area, and in the synchronous undulation area, the second reference plane is not in contact with the fourth reference plane.

Further, the second polar plate is provided with a coolant diversion dike, and the coolant diversion dike is a part of the fourth reference plane formed by blocking a part of the fourth flow channel.

Further, a coolant inlet and a coolant outlet are arranged at two diagonal corners on opposite sides of the bipolar plate, respectively, and are in interconnected with coolant flow channels respectively corresponding to two synchronous undulation areas located at the diagonal corners.

Further, a coolant inlet and a coolant outlet are arranged at adjacent inner corners on a same side of the bipolar plate, respectively, and are in interconnected with coolant flow channels respectively corresponding to two synchronous undulation areas located at the adjacent inner corners on the same side.

Further, the synchronous undulation area is provided with a plurality of upper support platforms or lower support platforms. The upper support platform is a part of the second reference plane formed by blocking a part of the second flow channel, and the lower support platform is a part of the fourth reference plane formed by blocking a part of the fourth flow channel.

Further, the first polar plate and the second polar plate are made of a metal thin plate or an alloy thin plate by a pressure processing method, and a thickness of the metal thin plate or the alloy thin plate is less than 0.5 mm.

Further, the bipolar plate includes a cross flow area and a parallel flow area, and a projected area of the cross flow area in a fifth reference plane is larger than a projected area of the parallel flow area in the fifth reference plane. The fifth reference plane refers to a plane perpendicular to the thickness direction and is a virtual plane.

The cross flow area is a first area on the bipolar plate. In the fuel cell stack, an included angle formed between a flow direction of the fluid in the first flow channel of the cross flow area and a flow direction of the fluid in the third flow channel of the cross flow area ranges from 60 degrees to 120 degrees.

The parallel flow area is a second area on the bipolar plate. In the fuel cell stack, an included angle formed between a flow direction of the fluid in the first flow channel of the parallel flow area and a flow direction of the fluid in the third flow channel of the parallel flow area ranges from 0 degrees to 30 degrees or from 150 degrees to 180 degrees.

The synchronous undulation area on the bipolar plate is located in or overlaps with the parallel flow area.

Further, the second polar plate is provided with two or more coolant diversion dikes, so that the coolant is guided by the coolant diversion dikes to flow in a space between the first polar plate and the second polar plate in an S shape or serpentine shape.

A bipolar plate includes a first polar plate and a second polar plate. The first polar plate includes a first side and a second side, and the second polar plate includes a third side and a fourth side. The first side of the first polar plate is provided with a first flow channel and a first reference plane, and the third side of the second polar plate is provided with a third flow channel and a third reference plane. The first flow channel is a groove formed in a thickness direction relative to the first reference plane, and the third flow channel is a groove formed in the thickness direction relative to the third reference plane. The second side of the first polar plate is provided with a second flow channel and a second reference plane, and the fourth side of the second polar plate is provided with a fourth flow channel and a fourth reference plane. The second flow channel is a groove formed in the thickness direction relative to the second reference plane, and the fourth flow channel is a groove formed in the thickness direction relative to the fourth reference plane. The thickness direction is parallel to a stacking direction of the bipolar plate in a fuel cell stack.

In the bipolar plate, the second side of the first polar plate is attached to the fourth side of the second polar plate and a part of the second reference plane is in contact with a part of the fourth reference plane. The first flow channel on the first side of the first polar plate includes an S-shaped segment, and the third flow channel on the third side of the second polar plate does not include the S-shaped segment. The S-shaped segment includes a fourth segment, a fifth segment and a sixth segment, and a length of the fifth segment is larger than three times a width of the sixth segment. In the fuel cell stack, the fluid flows through the fourth segment, the fifth segment and the sixth segment in turn. An included angle formed between a flow direction of the fluid in the fourth segment and a flow direction of the fluid in the sixth segment ranges from 0 degrees to 30 degrees, an included angle formed between the flow direction of the fluid in the fourth segment and a flow direction of the fluid in the fifth segment ranges from 60 degrees to 120 degrees, and an included angle formed between the flow direction of the fluid in the fifth segment and the flow direction of the fluid in the sixth segment ranges from 60 degrees to 120 degrees.

The bipolar plate includes a synchronous undulation area. The synchronous undulation area is a region on the bipolar plate, and a part of the second flow channel, a part of the second reference plane, a part of the fourth flow channel and a part of the fourth reference plane are located in the synchronous undulation area, and in the synchronous undulation area, the second reference plane is not in contact with the fourth reference plane.

Further, the second polar plate is provided with a coolant diversion dike, and the coolant diversion dike is a part of the fourth reference plane formed by blocking a part of the fourth flow channel.

Further, the synchronous undulation area is provided with a plurality of upper support platforms or lower support platforms. The upper support platform is a part of the second reference plane formed by blocking a part of the second flow channel, and the lower support platform is a part of the fourth reference plane formed by blocking a part of the fourth flow channel.

Further, the first polar plate and the second polar plate are made of a metal or alloy thin plate with a thickness of less than 0.5 mm by a pressure processing method.

Further, the bipolar plate includes a cross flow area and a parallel flow area, and a projected area of the cross flow area in a reference plane is larger than a projected area of the parallel flow area in the reference plane. The reference plane refers to a plane perpendicular to the thickness direction and is a virtual plane.

The cross flow area is a first area on the bipolar plate. In the fuel cell stack, an included angle formed between a flow direction of the fluid in the first flow channel of the cross flow area and a flow direction of the fluid in the third flow channel of the cross flow area ranges from 60 degrees to 120 degrees.

The parallel flow area is a second area on the bipolar plate. In the fuel cell stack, an included angle formed between a flow direction of the fluid in the first flow channel of the parallel flow area and a flow direction of the fluid in the third flow channel of the parallel flow area ranges from 0 degrees to 30 degrees or from 150 degrees to 180 degrees.

The synchronous undulation area on the bipolar plate is located in or overlaps with the parallel flow area.

Further, the second polar plate is provided with two or more coolant diversion dikes, so that the coolant is guided by the coolant diversion dikes to flow in a space between the first polar plate and the second polar plate in an S shape or serpentine shape.

A fuel cell stack includes the bipolar plate.

A fuel cell power generation system includes the fuel cell stack.

The advantages of the present invention are as follows.

(1) When the bipolar plate of the present invention is installed in the proton exchange membrane fuel cell stack, the flow channel (usually a serpentine flow channel) with a U-shaped segment or the flow channel with an S-shaped segment is arranged on the anode side, so that the hydrogen with better fluidity than air and oxygen is made to be directionally diverted many times in the flowing process to generate a relatively large pressure drop, which is beneficial to the diffusion of hydrogen to the gas diffusion layer and the catalyst. The flow channel (straight-through flow channel) without the U-shaped segment or the S-shaped segment is arranged on the cathode side, so that the air or oxygen with lower fluidity than hydrogen does not need to be directionally diverted in the flowing process. In this way, on the cathode side the appropriate pressure drop can be obtained and the produced water can be discharged optimally.

(2) The present invention allows the coolant to flow through the whole reaction area without increasing the thickness of the bipolar plate by setting the synchronous undulation area, which is convenient for controlling the temperature of the fuel cell stack.

(3) The present invention can control the flow route of the coolant by setting the coolant diversion dike, which can not only eliminate the dead corner of the coolant flow channel (the area where the coolant can not smoothly flow), but also control the flow rate of coolant, thereby reducing the parasitic power produced by the coolant pump.

(4) In the present invention, the transverse bar shaping the first flow channel on the first polar plate and the longitudinal bar shaping the third flow channel on the second polar plate can apply cross-pressure on the membrane electrode assembly, thereby reducing the internal resistance of the fuel cell.

DETAILED DESCRIPTION OF THE EMBODIMENTS

Figure 1A:
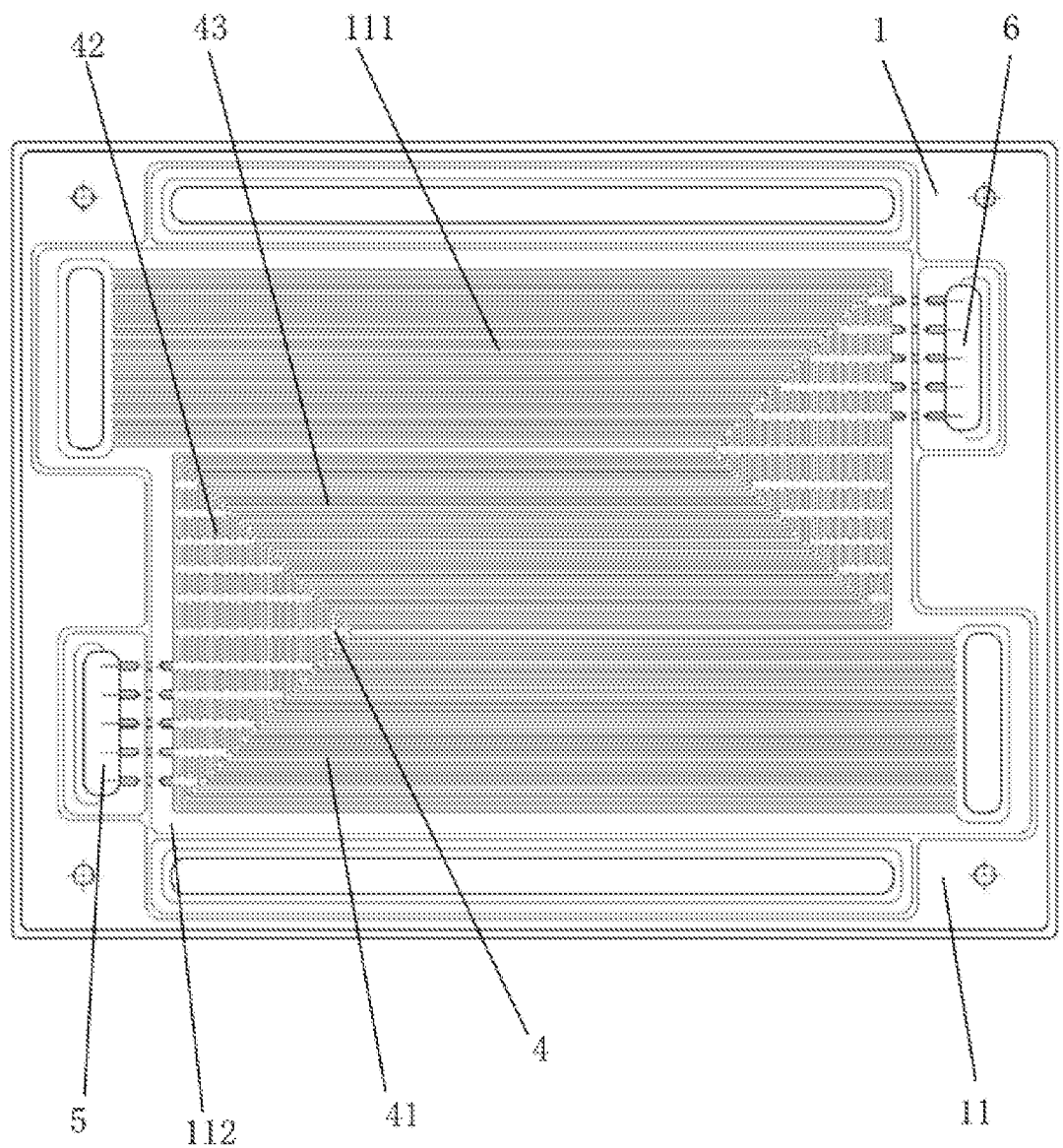
FIG. 1A is a schematic diagram of the structure of the first side of the first polar plate of the bipolar plate according to embodiment 1 of the present invention.

The present invention is further described below in combination with the drawings and specific embodiments, so that those skilled in the art can better understand and implement the present invention, but the embodiments described herein are not used to limit the present invention.

The present invention provides a bipolar plate, the first side of the first polar plate of the bipolar plate and the third side of the second polar plate of the bipolar plate have different flow fields, so that the flow direction of the fuel (hydrogen) in the fuel flow channel changes at least four times; while the flow direction of the oxidant in the oxidant flow channel is constant without any change, so that the air or oxygen whose fluidity is worse than hydrogen does not need to turn in the flowing process. In this way, on the cathode side the appropriate pressure drop can be obtained and the produced water can be discharged.

According to Embodiment 1 of the present invention shown in FIGS. 1A-3, a bipolar plate includes the first polar plate 1 and the second polar plate 2. The first polar plate 1 includes the first side 11 and the second side 12, and the second polar plate 2 includes the third side 21 and the fourth side 22. The second side 12 of the first polar plate 1 is attached to the fourth side 22 of the second polar plate 2, and the coolant flow channel 3 is formed between the second side 12 and the fourth side 22. The first side 11 of the first polar plate 1 is provided with the first flow channel 111 and the first reference plane 112, and the second side 12 of the first polar plate 1 is provided with the second flow channel 121 and the second reference plane 122. The third side 21 of the second polar plate 2 is provided with the third flow channel 211 and the third reference plane 212, and the fourth side 22 of the second polar plate 2 is provided with the fourth flow channel 221 and the fourth reference plane 222. The first flow channel 111 is a groove formed in the thickness direction relative to the first reference plane 112, the second flow channel 121 is a groove formed in the thickness direction relative to the second reference plane 122, the third flow channel 211 is a groove formed in the thickness direction relative to the third reference plane 212, and the fourth flow channel 221 is a groove formed in the thickness direction relative to the fourth reference plane 222. The thickness direction is parallel to the stacking direction of the bipolar plate when the bipolar plate is arranged in the fuel cell stack. The first flow channel 111 includes the U-shaped segment 4, and the third flow channel includes a plurality of parallel straight-through flow channels or a plurality of parallel wave-shaped flow channels with small oscillations rather than the U-shaped segment. The U-shaped segment 4 includes the first segment 41, the second segment 42 and the third segment 43, which are connected sequentially. The flow directions of the fluid participating in the electrochemical reaction or the electrochemical reaction product in the first segment 41, the second segment 42 and the third segment 43 are a first direction, a second direction and a third direction, respectively. The first direction is opposite to the third direction, the first direction and the second direction are perpendicular to each other, and the second direction and the third direction are perpendicular to each other. The included angles between the first direction and the second direction, between the first direction and the third direction, as well as between the second direction and the third direction are preferred as this, but not limited. For example, the included angle formed between the first direction and the third direction ranges from 150 degrees to 180 degrees, the included angle formed between the first direction and the second direction ranges from 60 degrees to 120 degrees, and the included angle formed between the second direction and the third direction ranges from 60 degrees to 120 degrees.

The second flow channel 121 (corresponding to the first flow channel in a concave-convex manner) includes the transverse segment H and the longitudinal segment Z, and the transverse segment H is parallel to the second segment 42 of the U-shaped segment 4 in the first flow channel 111.

The bipolar plate of the present invention includes at least two synchronous undulation areas for introducing and discharging the coolant. The synchronous undulation areas are located between the second side 12 and the fourth side 22 and correspond to the transverse segment H (the second segment 42). The synchronous undulation area refers to a specific area on the bipolar plate, and includes a part of the second flow channel 121, a part of the second reference plane 122, a part of the fourth flow channel 221 and a part of the fourth reference plane 222. In the synchronous undulation area, the second reference plane 122 is not in contact with the fourth reference plane 222. The second flow channel 121 in the synchronous undulation area is the transverse segment H of the second flow channel 121.

The bipolar plate further includes the coolant inlet channel 5 and the coolant outlet channel 6, which are respectively located at two diagonal corners on the opposite sides of the bipolar plate. The coolant inlet channel 5 is interconnected with a coolant flow channel in one synchronous undulation area, and the coolant outlet channel is interconnected with a coolant flow channel in another synchronous undulation area. The coolant flows from the coolant inlet channel 5 into one of the synchronous undulation areas, and then flows longitudinally along the second flow channel and transversely along the fourth flow channel concurrently to cover the whole reaction area, and then flows out from another synchronous undulation area into the coolant outlet channel 6. The direction of the arrow in FIG. 3 indicates the flow route of the coolant.

Figure 3:
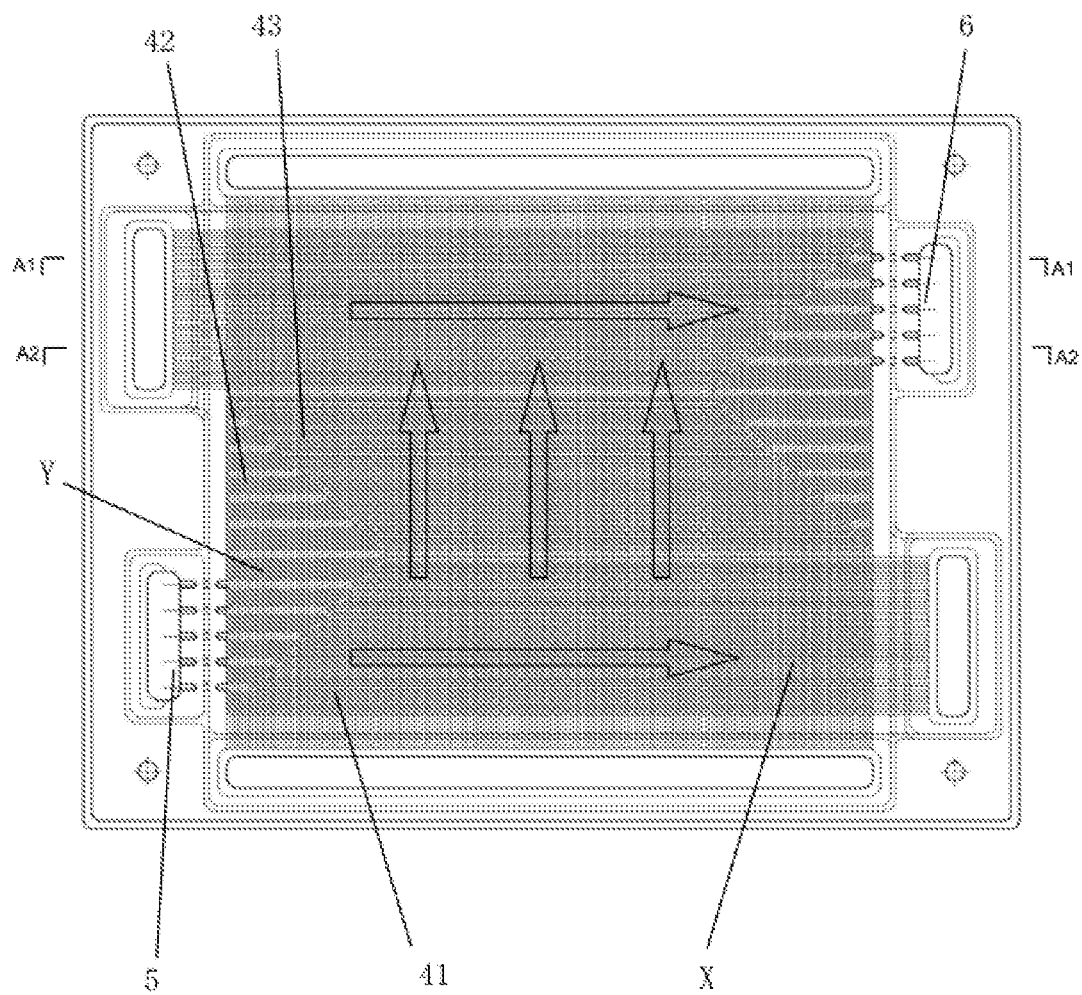
FIG. 3 is a schematic diagram of a combined state of the bipolar plate according to embodiment 1 of the present invention.

As shown in FIG. 3, the bipolar plate includes the cross flow area X and the parallel flow area Y, and the projected area of the cross flow area X in the fifth reference plane is larger than the projected area of the parallel flow area Y in the fifth reference plane. The fifth reference plane refers to a plane perpendicular to the thickness direction and is a virtual plane. The cross flow area X is one area on the bipolar plate. In the fuel cell stack, the included angle formed between the flow direction of the fluid in the first flow channel of the cross flow area and the flow direction of the fluid in the third flow channel of the cross flow area ranges from 60 degrees to 120 degrees (preferably 90 degrees). The parallel flow area Y is one area on the bipolar plate. In the fuel cell stack, the included angle formed between the flow direction of the fluid in the first flow channel of the parallel flow area and the flow direction of the fluid in the third flow channel of the parallel flow area ranges from 0 degrees to 30 degrees or from 150 degrees to 180 degrees (preferably 0 degrees or 180 degrees). The synchronous undulation area on the bipolar plate is located in or overlaps with the parallel flow area Y. In the synchronous undulation area, the second flow channel and the fourth flow channel are interlaced with each other, the centerline of the projection of the second flow channel and the centerline of the projection of the fourth flow channel on the fifth reference plane are parallel but do not overlap. The second reference plane is interlaced with the fourth reference plane, forming a connected coolant flow channel with a wavy cross-section, so that the coolant can flow into both the second flow channel and the fourth flow channel.

Figure 1B:
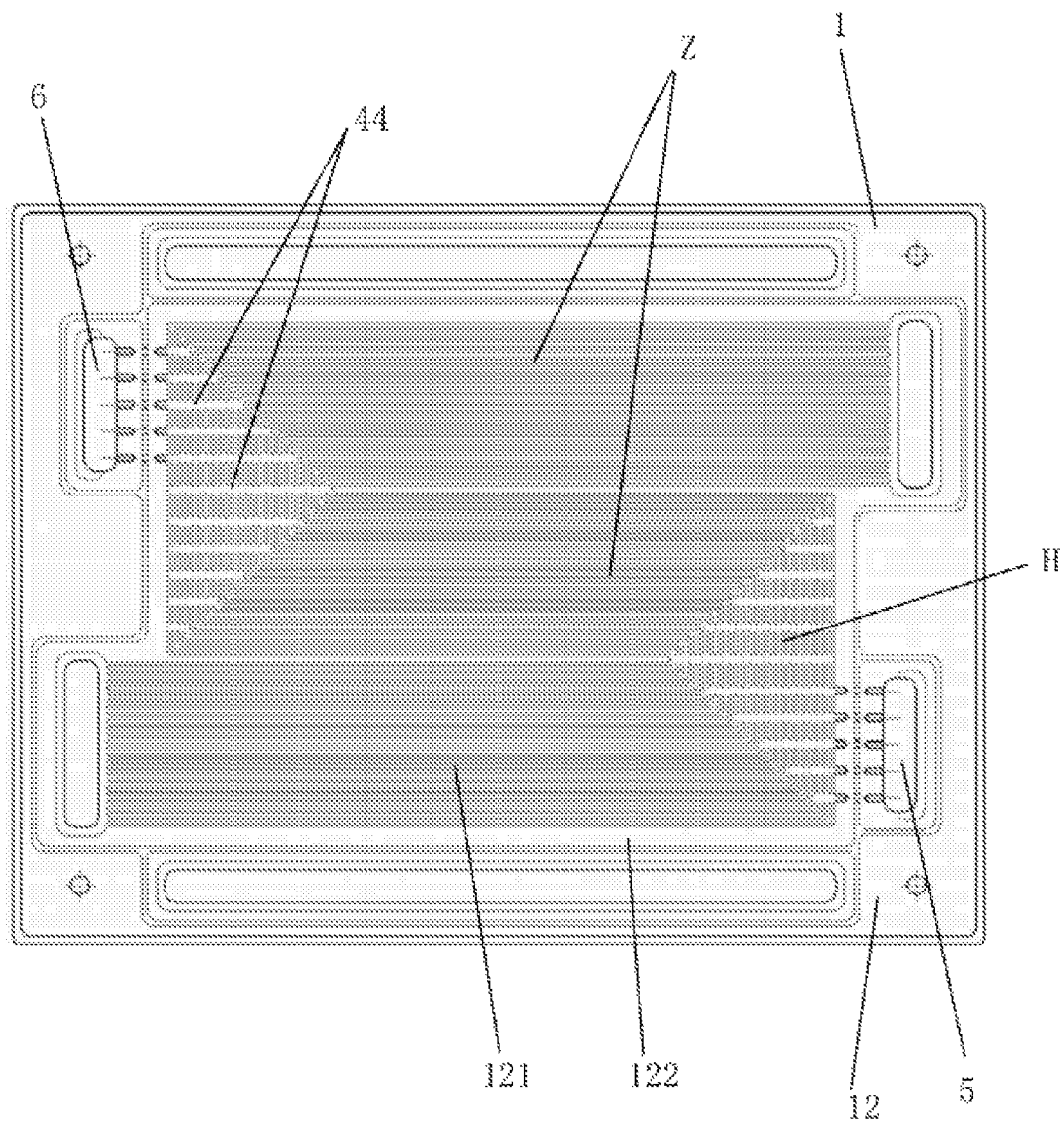
FIG. 1B is a schematic diagram of the structure of the second side of the first polar plate of the bipolar plate according to embodiment 1 of the present invention.
Figure 2A:
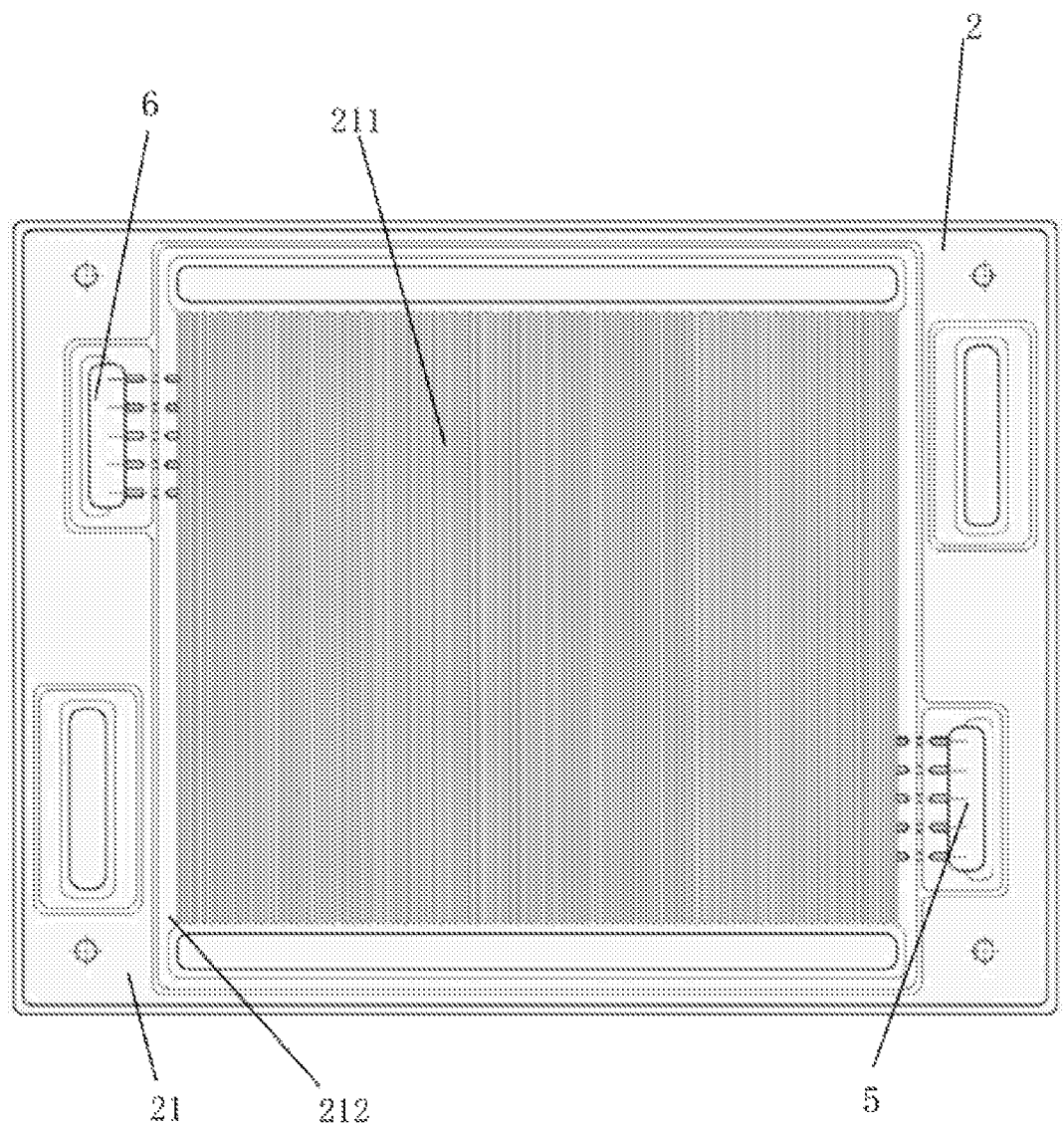
FIG. 2A is a schematic diagram of the structure of the third side of the second polar plate of the bipolar plate according to embodiment 1 of the present invention.
Figure 2B:
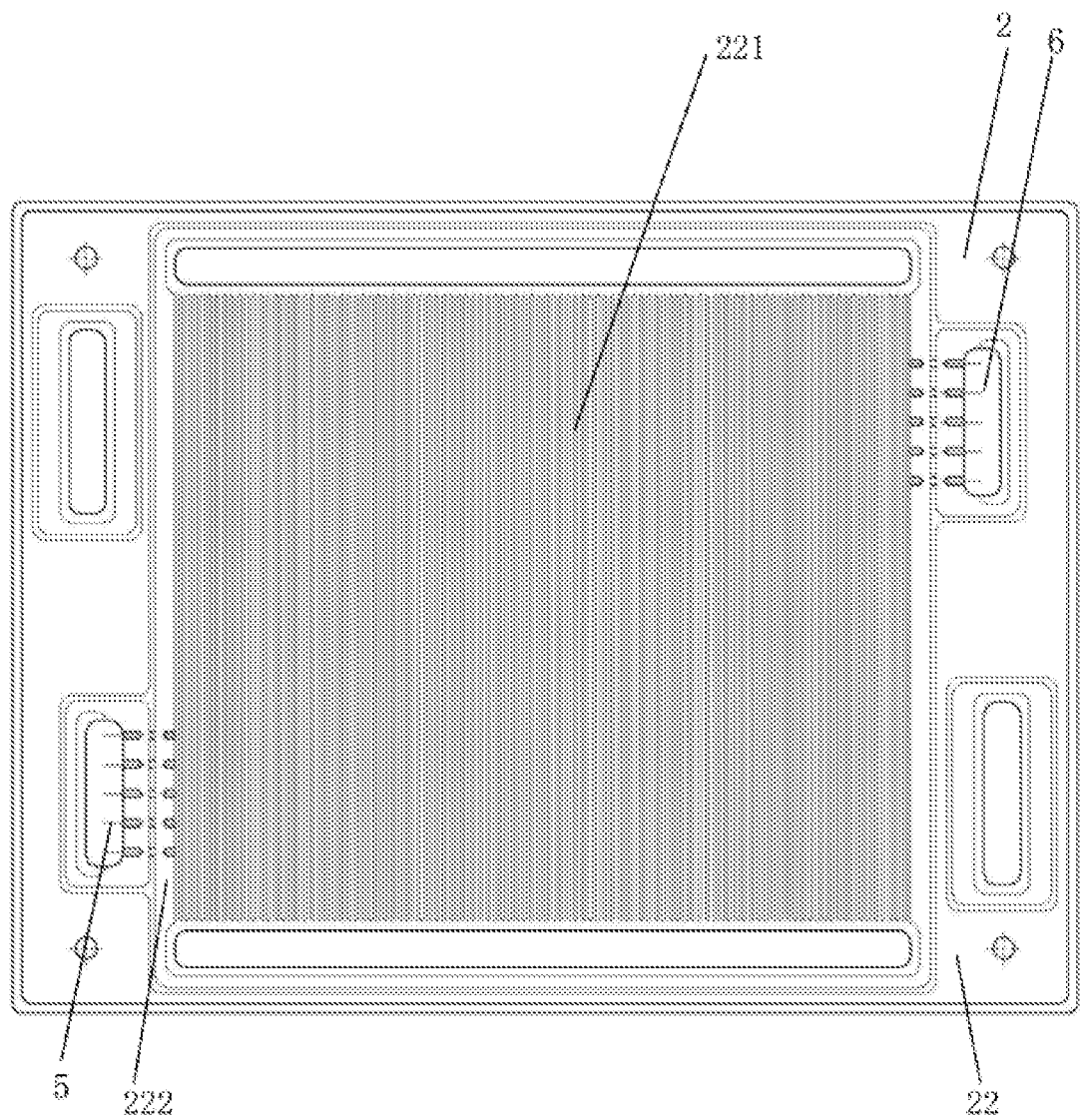
FIG. 2B is a schematic diagram of the structure of the fourth side of the second polar plate of the bipolar plate according to embodiment 1 of the present invention.
Figure 6A:
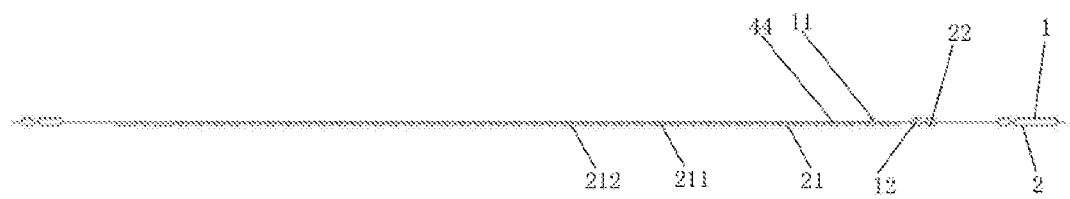
FIG. 6A is a sectional view of FIG. 3 along the A1-A1 direction.
Figure 7A:
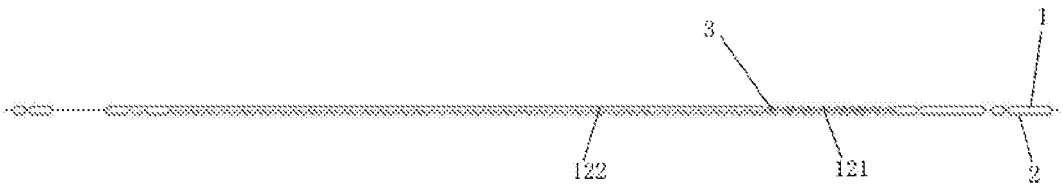
FIG. 7A is a sectional view of FIG. 3 along the A2-A2 direction.

In addition, as shown in FIGS. 1B, 6A and 7A, in order to prevent the coolant flow channel 3 from being blocked due to the compressional deformation of the upper and lower polar plates in the synchronous undulation area, a plurality of upper support platforms 44 are arranged at the transverse segment H, and each upper support platform 44 blocks the second flow channel 121 to accordingly make the first flow channel on the back interconnected. Also, a plurality of lower support platforms may be arranged at the position of the fourth flow channel corresponding to the transverse segment H, and each lower support platform blocks the fourth flow channel 221 to accordingly make the third flow channel on the back interconnected. In fact, the upper support platform is the second reference plane formed by blocking a part of the second flow channel, and the lower support platform is the fourth reference plane formed by blocking a part of the fourth flow channel.

According to Embodiment 2 of the present invention shown in FIGS. 4-5, 6B, 7B, 7C, and 8-10, the coolant inlet 5 and the coolant outlet 6 are arranged at two diagonal corners on the opposite sides of the bipolar plate, respectively, and are interconnected with two synchronous undulation areas located at the diagonal corners, respectively. The structure of the first polar plate 1 of the present embodiment is the same as the structure of the first polar plate 1 of the embodiment 1.

The second polar plate 2 is provided with the coolant diversion dike 7, and the coolant diversion dike 7 is the fourth reference plane formed on the fourth side 22 by blocking a part of the fourth flow channel 221. The coolant diversion dike 7 extends inward from the outermost side of the fourth flow channel, and is perpendicular to or nearly perpendicular to the fourth flow channel 221. The length of the coolant diversion dike 7 is less than the total width of all fourth flow channels 221. Preferably, the inner side of the coolant inlet 5 and the inner side of the coolant outlet 6 are provided with the coolant diversion dike 7, respectively, so that the coolant flows in the space between the first polar plate and the second polar plate in an S shape or serpentine shape. Of course, more coolant diversion dikes 7 can be set. The direction of the arrow in FIG. 10 indicates the mainstream flow route of the coolant.

Figure 6B:
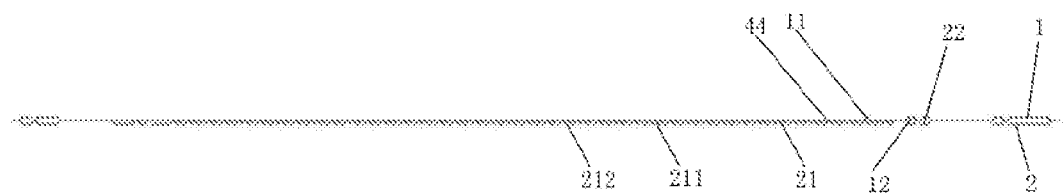
FIG. 6B is a sectional view of FIG. 5 along the A11-A11 direction.
Figure 7B:
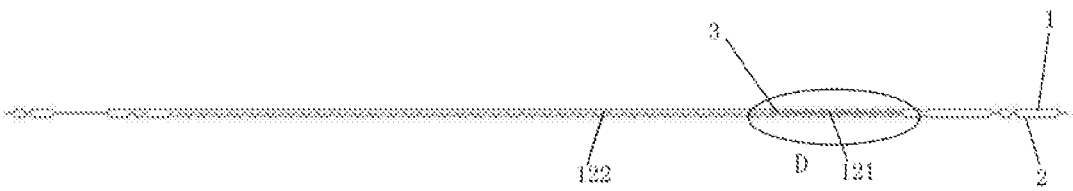
FIG. 7B is a sectional view of FIG. 5 along the A21-A21 direction.
Figure 7C:
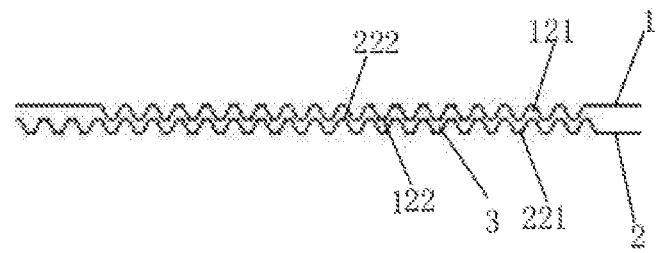
FIG. 7C is an enlarged view of the portion D in FIG. 7B.
Figure 8:
FIG. 8 is a sectional view of FIG. 5 along the B1-B1 direction.
Figure 9:
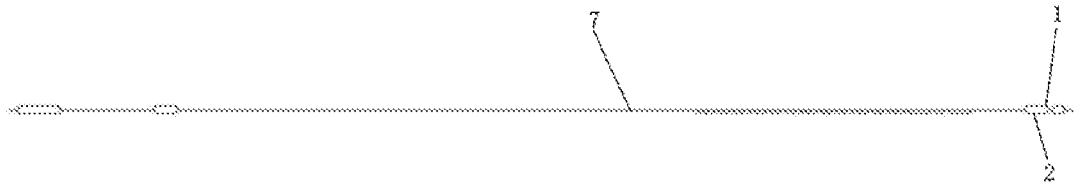
FIG. 9 is a sectional view of FIG. 5 along the B2-B2 direction.
Figure 10:
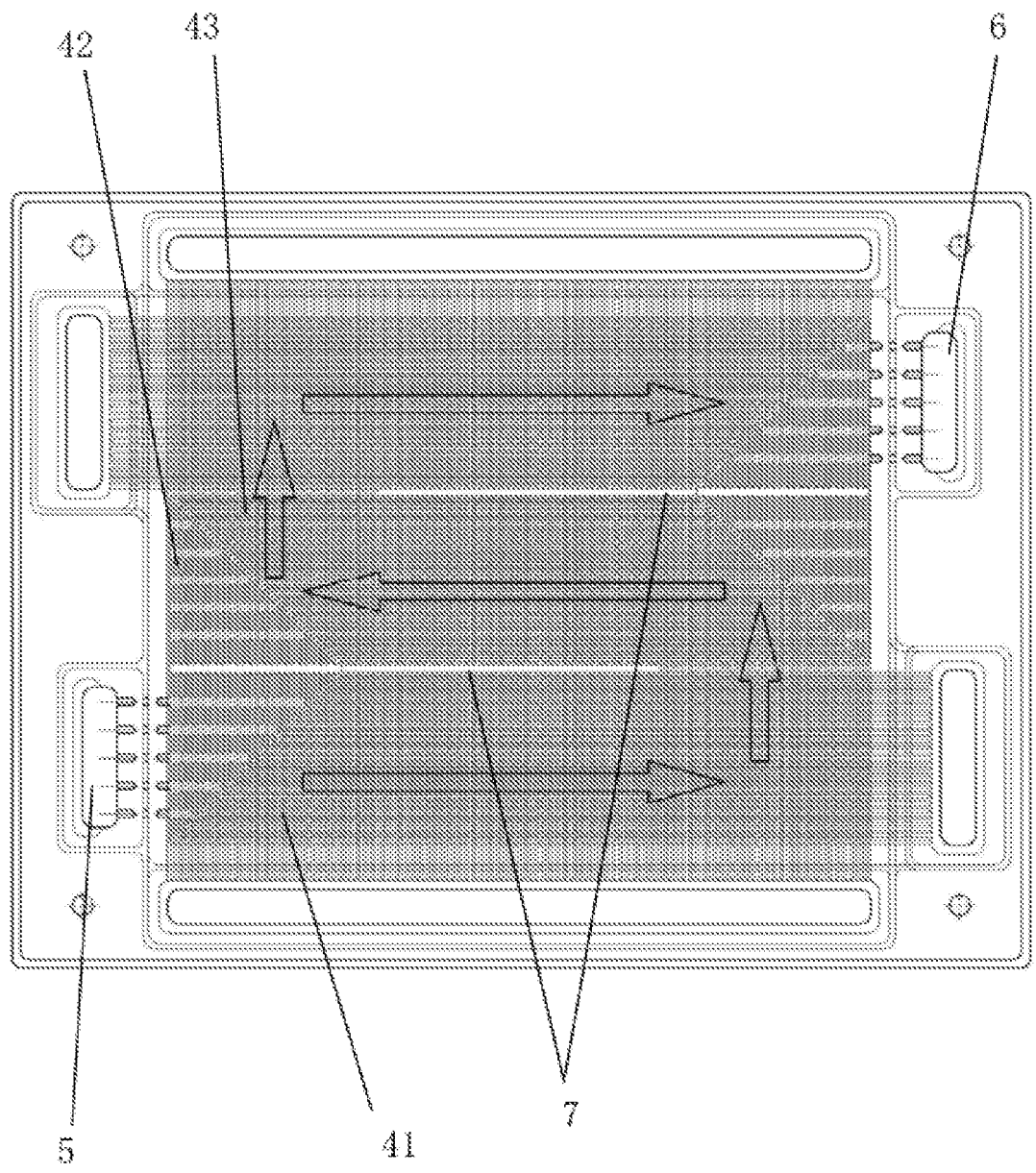
FIG. 10 is a schematic diagram of the flow direction of coolant in the bipolar plate according to embodiment 2 of the present invention.

Similarly, as shown in FIGS. 6B and 7B, in order to prevent the coolant flow channel 3 from being blocked due to the compressional deformation of the upper and lower polar plates in the synchronous undulation area, a plurality of upper support platforms 44 are arranged at the transverse segment H. Of cause, a plurality of lower support platforms may be arranged at the transverse segment H.

Figure 11A:
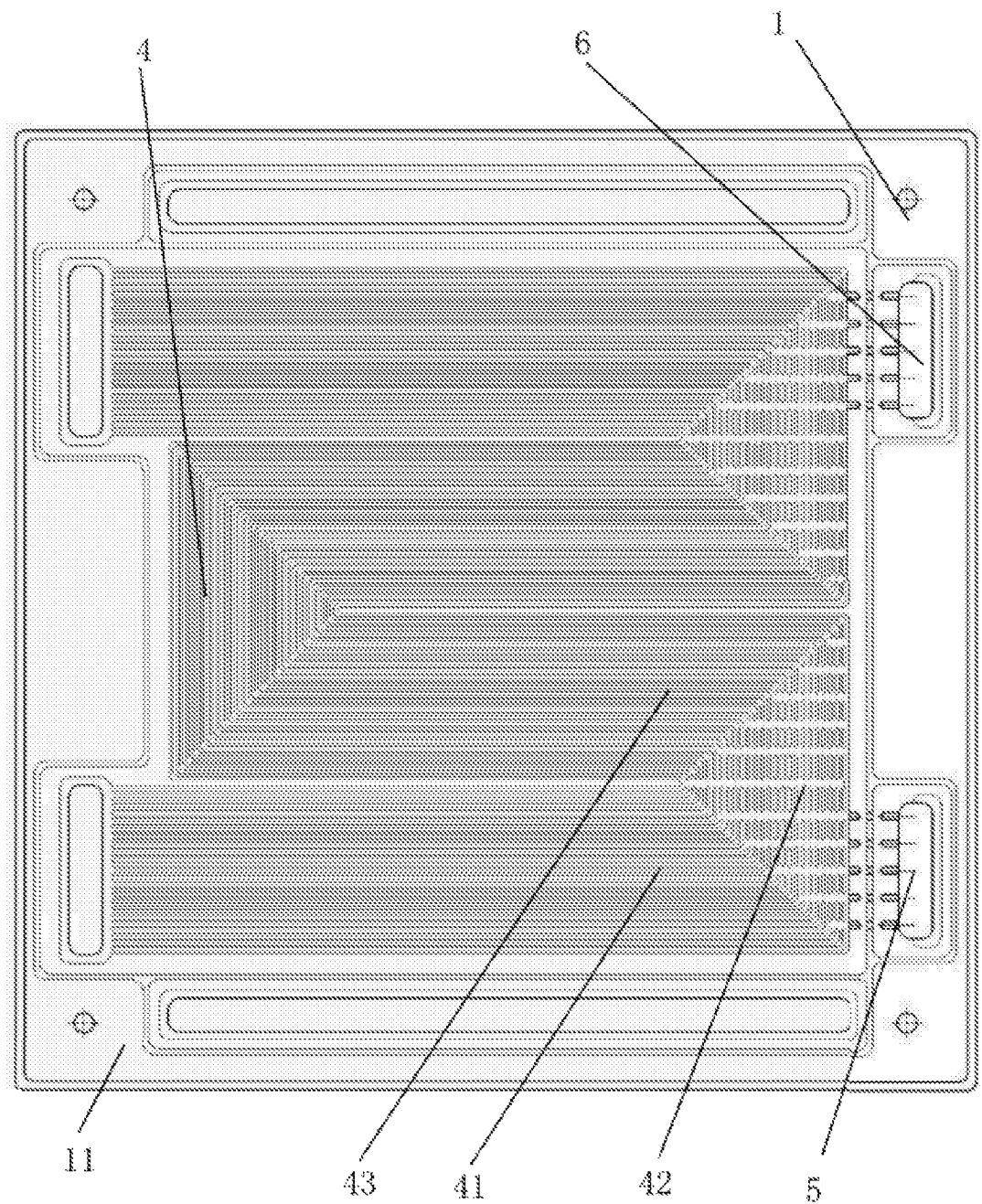
FIG. 11A is a schematic diagram of the structure of the first side of the first polar plate of the bipolar plate according to embodiment 3 of the present invention.
Figure 11B:
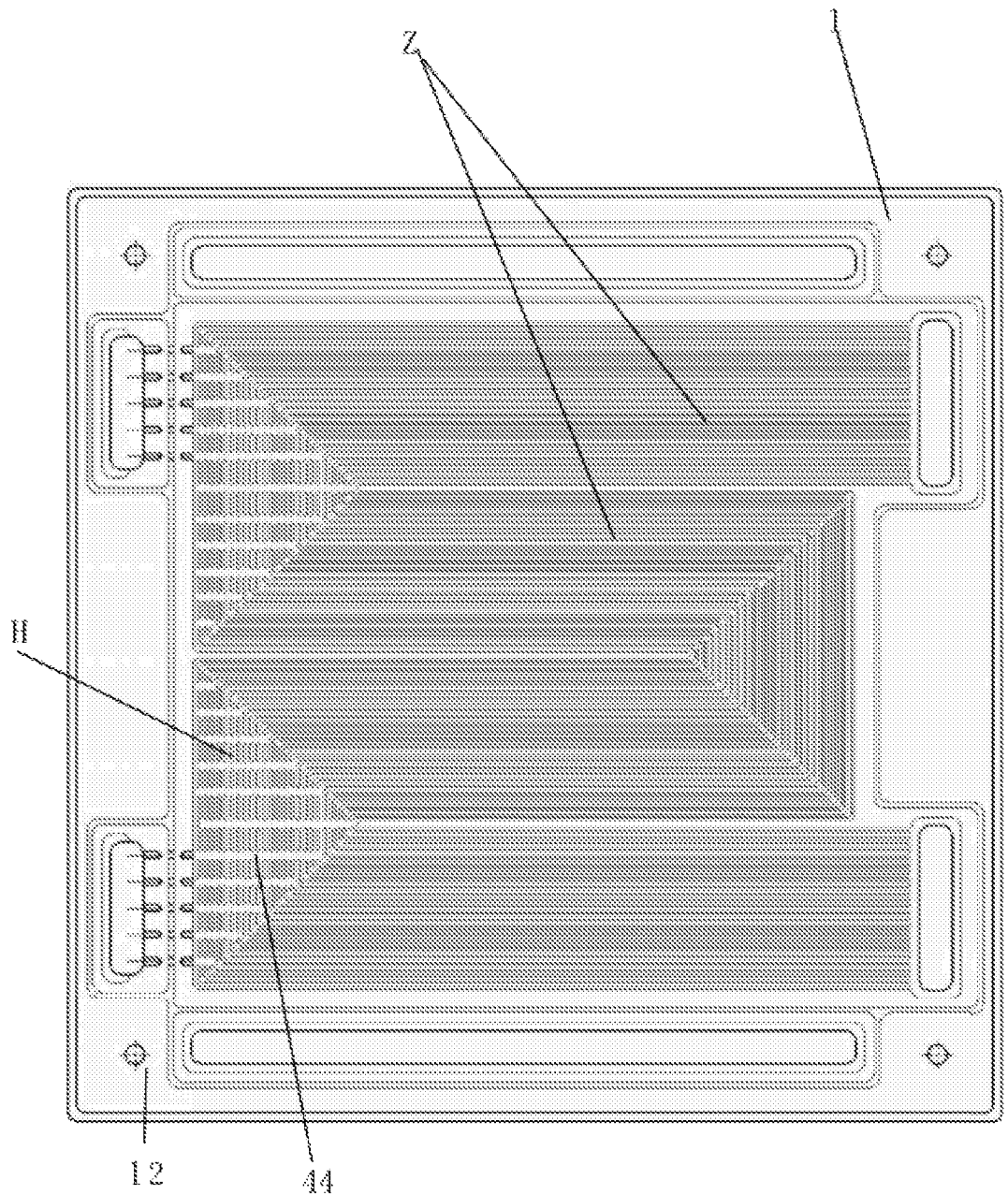
FIG. 11B is a schematic diagram of the structure of the second side of the first polar plate of the bipolar plate according to embodiment 3 of the present invention.
Figure 12:
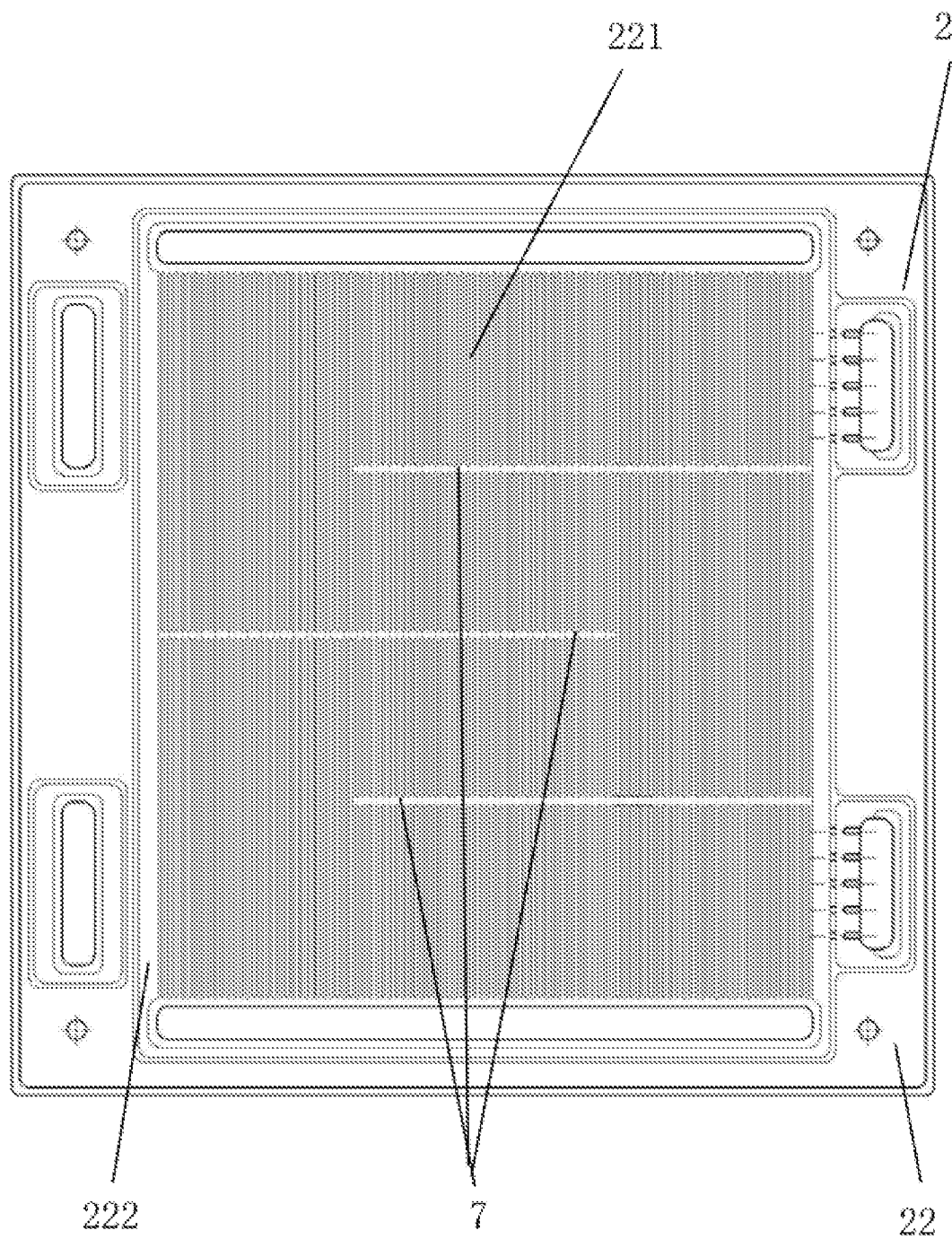
FIG. 12 is a schematic diagram of the structure of the fourth side of the second polar plate of the bipolar plate according to embodiment 3 of the present invention.

According to Embodiment 3 of the present invention shown in FIGS. 11A-13, the bipolar plate of the present embodiment is different from that in the embodiment 2 in that, the coolant inlet 5 and the coolant outlet 6 are arranged at the adjacent inner corners on the same side of the bipolar plate, respectively, and are interconnected with the coolant flow channels 3 respectively corresponding to the two synchronous undulation areas located at the adjacent inner corners on the same side. The structure of the first polar plate 1 of the present embodiment is shown in FIGS. 11A and 11B, and the structure of the second polar plate 2 of the present embodiment is shown in FIG. 12.

Figure 13:
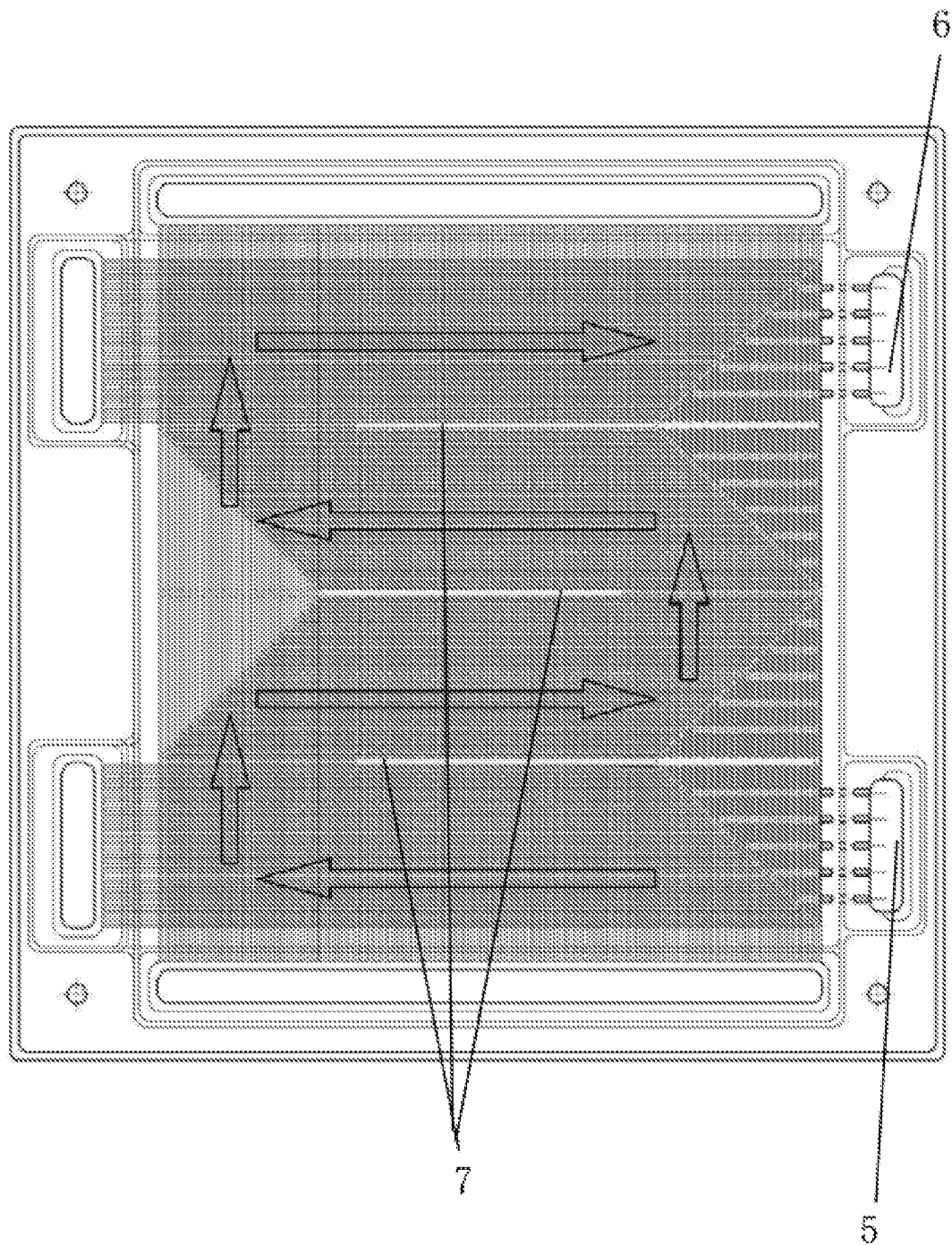
FIG. 13 is a schematic diagram of a combined state of the bipolar plate according to embodiment 3 of the present invention.

The second polar plate 2 is provided with the coolant diversion dike 7, and the coolant diversion dike 7 is the strip-shaped fourth reference plane formed on the fourth side 22 by blocking the fourth flow channel 221, and is arranged between adjacent longitudinal segments Z corresponding to the second flow channel. The coolant diversion dike 7 extends inward from the outermost side of the fourth flow channel, and is perpendicular to or nearly perpendicular to the fourth flow channel 221. The length of the coolant diversion dike 7 is less than the total width of all fourth flow channels 221. Preferably, the inner side of the coolant inlet 5 and the inner side of the coolant outlet 6 are provided with the coolant diversion dike 7, respectively, so that the coolant flows in the space between the first polar plate and the second polar plate in an S shape or serpentine shape. Of course, more coolant diversion dikes 7 can be set. FIG. 13 shows the assembly diagram of the first polar plate and the second polar plate, in which the direction of the arrow indicates the mainstream flow route of the coolant.

Figure 14A:
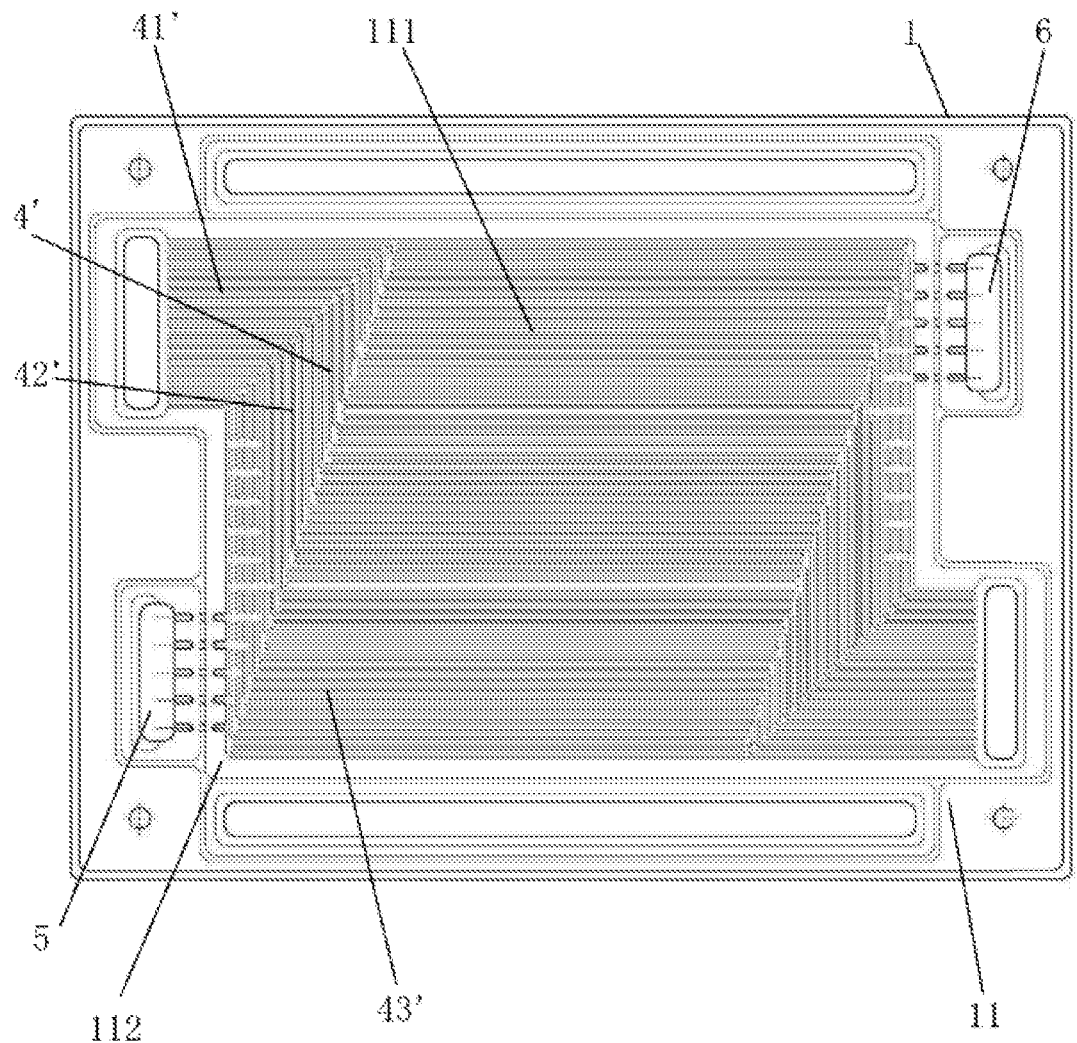
FIG. 14A is a schematic diagram of the structure of the first side of the first polar plate of the bipolar plate according to embodiment 4 of the present invention.
Figure 14B:
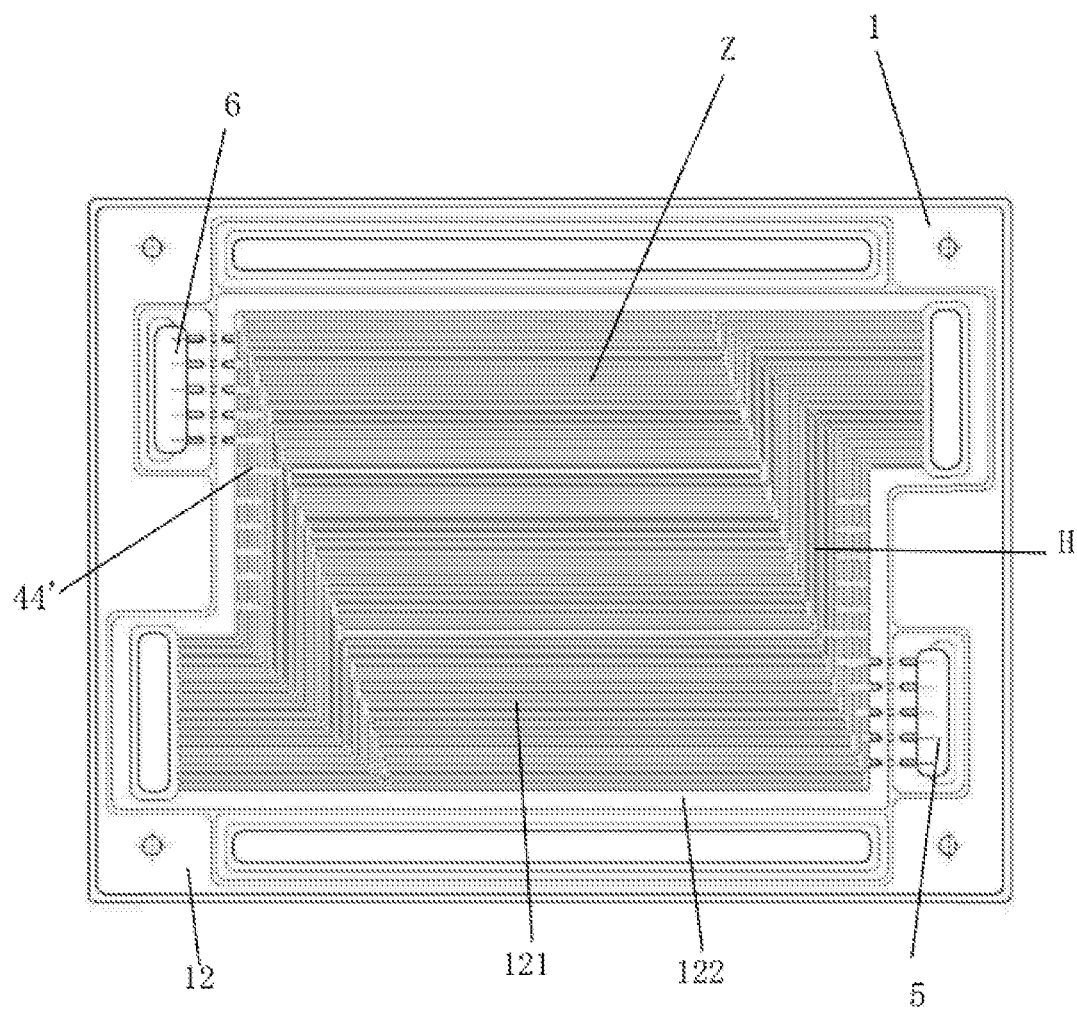
FIG. 14B is a schematic diagram of the structure of the second side of the first polar plate of the bipolar plate according to embodiment 4 of the present invention.
Figure 15:
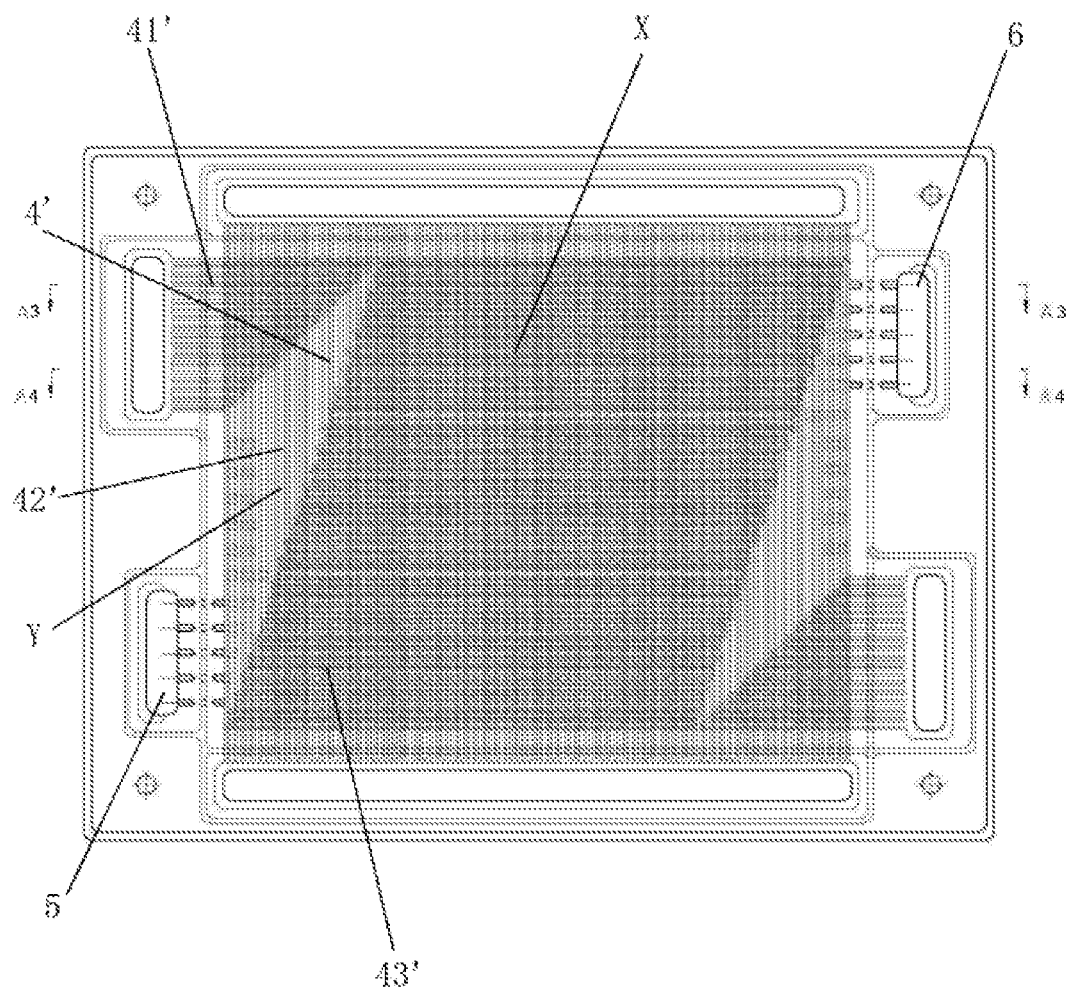
FIG. 15 is a schematic diagram of a combined state of the bipolar plate according to embodiment 4 of the present invention.
Figure 16:
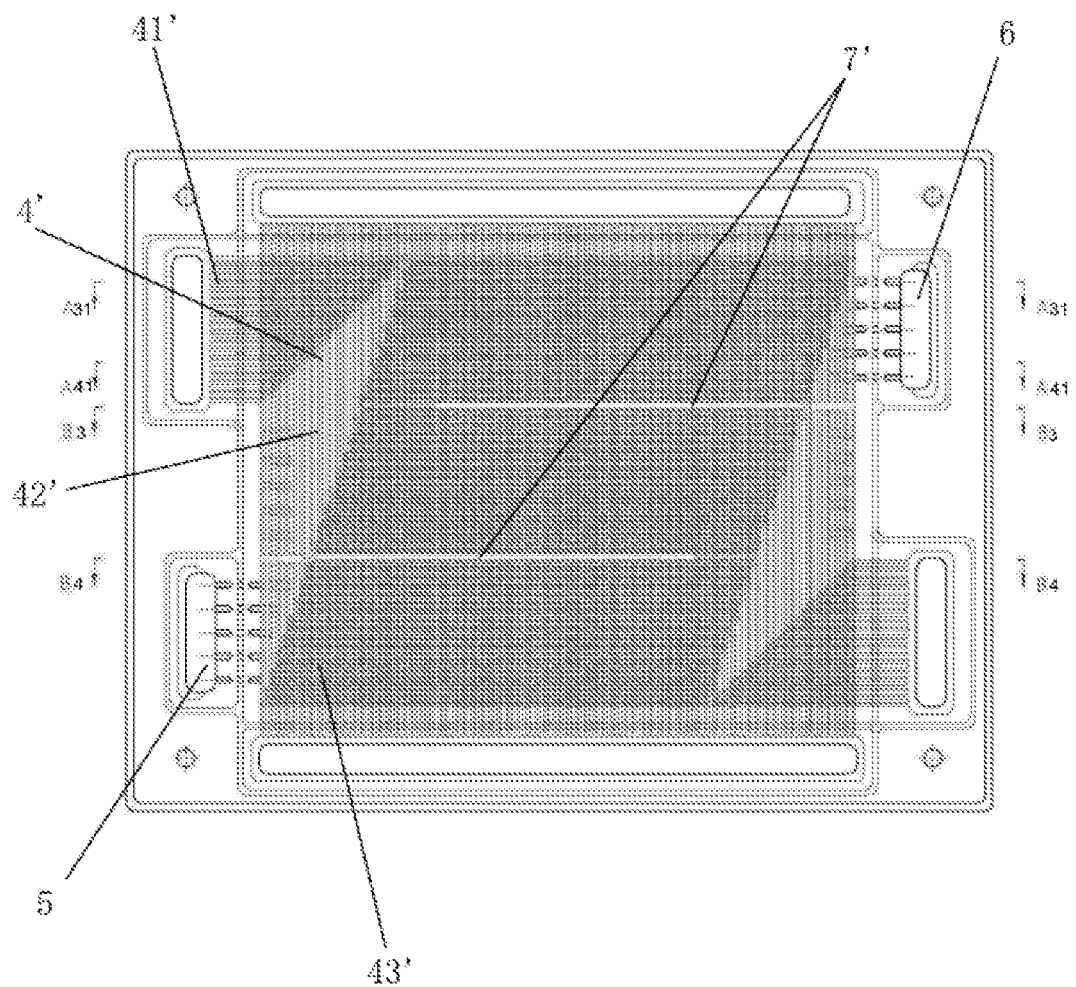
FIG. 16 is a schematic diagram of a combined state of the bipolar plate according to embodiment 5 of the present invention.

According to Embodiment 4 of the present invention shown in FIGS. 14A-15, the first flow channel 111 includes the S-shaped segment 4', and the third flow channel includes a plurality of parallel straight-through flow channels or a plurality of parallel wave-shaped flow channels with small oscillations rather than the S-shaped segment. The S-shaped segment 4' includes the fourth segment 41', the fifth segment 42' and the sixth segment 43', and the length of the fifth segment 42' is larger than three times the width of the sixth segment 43'. In the fuel cell stack, the fluid flows through the fourth segment 41', the fifth segment 42' and the sixth segment 43' sequentially. The included angle formed between the flow direction of the fluid in the fourth segment 41' and the flow direction of the fluid in the sixth segment 43' ranges from 0 degrees to 30 degrees (preferably 0 degree), the included angle formed between the flow direction of the fluid in the fourth segment 41' and the flow direction of the fluid in the fifth segment 42' ranges from 60 degrees to 120 degrees (preferably 90 degrees), and the included angle formed between the flow direction of the fluid in the fifth segment 42' and the flow direction of the fluid in the sixth segment 43' ranges from 60 degrees to 120 degrees (preferably 90 degrees). The structure of the first polar plate is shown in FIGS. 14A and 14B, and the structure of the second polar plate of the present embodiment is the same as the structure of the second polar plate in the embodiment 1. FIG. 15 shows the assembly diagram of the first polar plate and the second polar plate, and the flow route of the coolant is basically the same as the flow route of the coolant shown in FIG. 3.

The second flow channel 121 (corresponding to the first flow channel in a concave-convex manner) includes the transverse segment H and the longitudinal segment Z, and the transverse segment H is parallel to the fifth segment 42' of the S-shaped segment 4' in the first flow channel 111. The bipolar plate of the present embodiment similarly includes at least two synchronous undulation areas, and the synchronous undulation areas are located between the second side 12 and the fourth side 22 and correspond to the transverse segment H (the fifth segment 42'). The synchronous undulation area includes the second flow channel, the second reference plane, the fourth flow channel and the fourth reference plane. In the synchronous undulation area, the second reference plane 122 is not in contact with the fourth reference plane 222. The transverse segment H of the second flow channel 121 is located in the synchronous undulation area.

The bipolar plate further includes the coolant inlet channel 5 and the coolant outlet channel 6, which are respectively located at two diagonal corners on the opposite sides of the bipolar plate. The coolant inlet channel 5 is interconnected with one synchronous undulation area, and the coolant outlet channel 6 is interconnected with another synchronous undulation area. The coolant flows from the coolant inlet channel into one of the synchronous undulation areas, and then flows longitudinally along the second flow channel and transversely along the fourth flow channel concurrently to cover the whole reaction area, and then flows out from another synchronous undulation area into the coolant outlet channel.

As shown in FIG. 15, the bipolar plate includes the cross flow area X and the parallel flow area Y, and the projected area of the cross flow area X in the fifth reference plane is larger than the projected area of the parallel flow area Y in the fifth reference plane. Herein, the fifth reference plane refers to a plane perpendicular to the thickness direction and is a virtual plane. The cross flow area X is one area on the bipolar plate. In the fuel cell stack, the included angle formed between the flow direction of the fluid in the first flow channel of the cross flow area and the flow direction of the fluid in the third flow channel of the cross flow area ranges from 60 degrees to 120 degrees (preferably 90 degrees). The parallel flow area Y is one area on the bipolar plate. In the fuel cell stack, the included angle formed between the flow direction of the fluid in the first flow channel of the parallel flow area and the flow direction of the fluid in the third flow channel of the parallel flow area ranges from 0 degrees to 30 degrees or from 150 degrees 180 degrees (preferably 0 degrees or 180 degrees). The synchronous undulation area on the bipolar plate is located in or overlaps with the parallel flow area Y. In the synchronous undulation area, the second flow channel and the fourth flow channel are interlaced with each other, the centerline of the projection of the second flow channel and the centerline of the projection of the fourth flow channel on the reference plane are parallel but do not overlap to each other. The second reference plane is interlaced with the fourth reference plane, forming a connected coolant flow channel with a wavy cross-section, so that the coolant can flow into the second flow channel and the fourth flow channel.

Figure 17A:
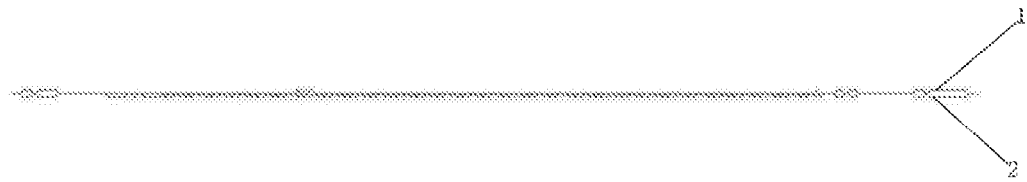
FIG. 17A is a sectional view of FIG. 15 along the A3-A3 direction.
Figure 17B:
FIG. 17B is a sectional view of FIG. 16 along the A31-A31 direction.
Figure 18A:
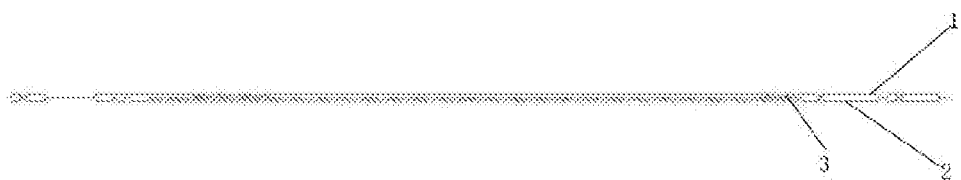
FIG. 18A is a sectional view of FIG. 15 along the A4-A4 direction.
Figure 18B:
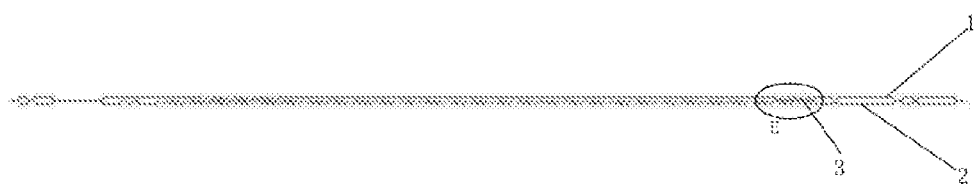
FIG. 18B is a sectional view of FIG. 16 along the A41-A41 direction.
Figure 18C:
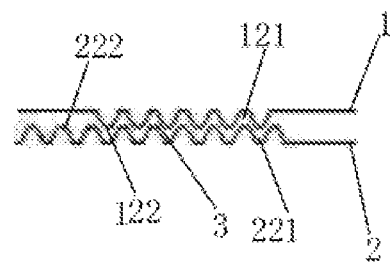
FIG. 18C is an enlarged view of the portion E in FIG. 18B.
Figure 19:
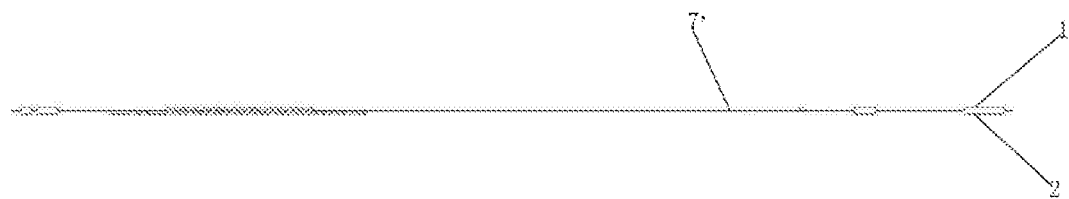
FIG. 19 is a sectional view of FIG. 16 along the B3-B3 direction.
Figure 20:
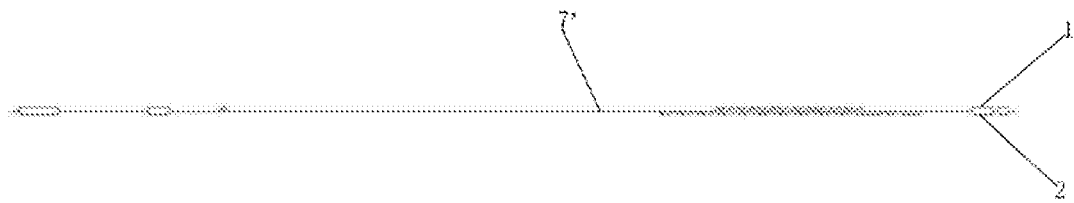
FIG. 20 is a sectional view of FIG. 16 along the B4-B4 direction.

As shown in FIGS. 14B, 17A and 18A, in order to prevent the coolant flow channel 3 from being blocked due to the compressional deformation of the upper and lower polar plates in the fifth segment 42', a plurality of upper support platforms 44' are arranged at the transverse segment H, and each upper support platform 44' blocks the second flow channel 121 to accordingly make the first flow channel on the back interconnected. Also, a plurality of lower support platforms may be arranged at the position of the fourth flow channel corresponding to the transverse segment H, and each lower support platform blocks the fourth flow channel 221 to accordingly make the third flow channel on the back interconnected. In fact, the upper support platform is the second reference plane formed by blocking a part of the second flow channel, and the lower support platform is the fourth reference plane formed by blocking a part of the fourth flow channel.

Figure 4:
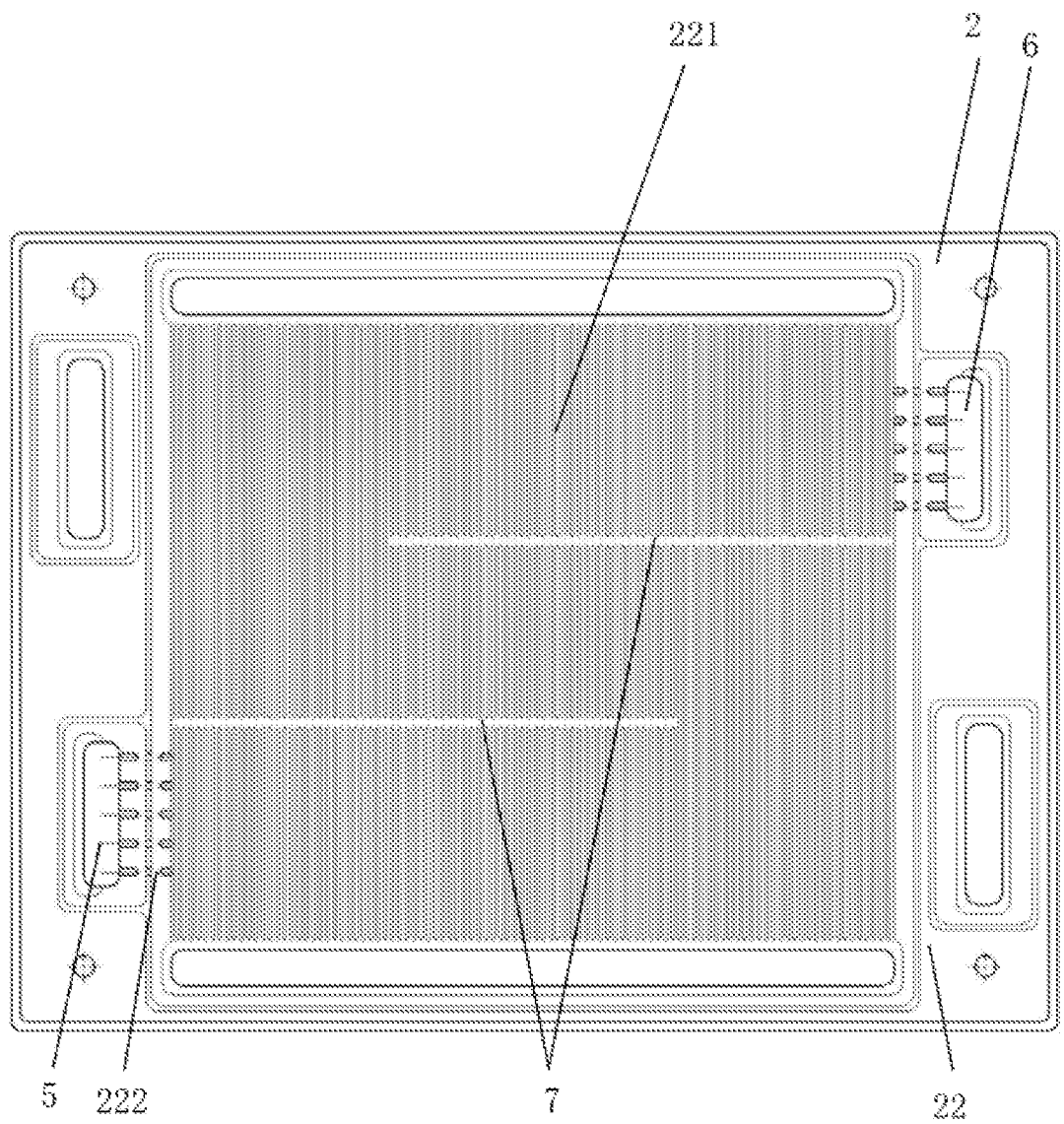
FIG. 4 is a schematic diagram of the structure of the fourth side of the second polar plate of the bipolar plate according to embodiment 2 of the present invention.
Figure 5:
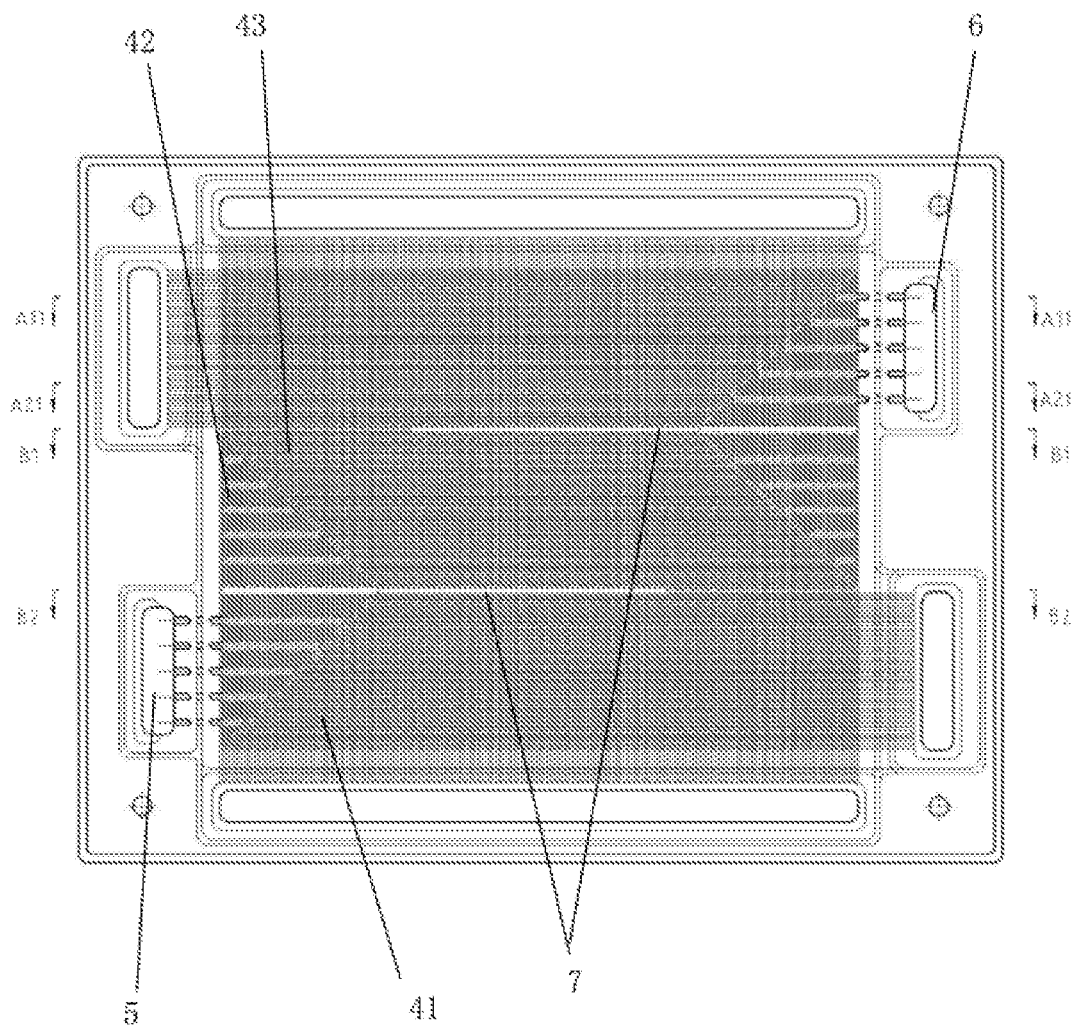
FIG. 5 is a schematic diagram of a combined state of the bipolar plate according to embodiment 2 of the present invention.

According to Embodiment 5 of the present invention shown in FIGS. 16, 17B, 18B, 18C, and 19-20, the structure of the first polar plate of the bipolar plate of the present embodiment is the same as the that of the embodiment 4, and the structure of the second polar plate is the same as the structure of the second polar plate in the embodiment 2, as shown in FIGS. 14A and 14B. As shown in FIG. 4, the coolant diversion dike 7 is set. The flow route of the coolant of the present embodiment is basically the same as the flow route of the coolant shown in FIG. 10.

From the point of view of geometric topology, the essential difference between the embodiments 4, 5 and the embodiments 1, 2 is that in the embodiments 4 and 5, the first flow channel on the first polar plate and the third flow channel on the second polar plate don't include a U-shaped segment (or a "reflux segment"); while in the embodiments 1 and 2, the first flow channel on the first polar plate includes a U-shaped segment (or a "reflux segment").

Preferably, the first polar plate 1 and the second polar plate 2 of each embodiment of the present invention are made of a metal or alloy thin plate with a thickness of less than 0.5 mm by a pressure processing method. The bipolar plate of each embodiment of the present invention further conventionally includes a fuel inlet channel, a fuel outlet channel, an oxidant inlet channel and an oxidant outlet channel, which are through holes arranged at the edge of the bipolar plate.

The present invention further provides a fuel cell stack, including the bipolar plate. In addition, the present invention also provides a fuel cell power generation system, including the fuel cell stack.

The above embodiments only exemplify the principle and effect of the present invention and are not used to limit the present invention. Many aspects of the present invention can be improved without violating the general idea, and anyone skilled in the art can modify or change the above embodiments without departing from the spirit and scope of the present invention. Therefore, all equivalent modifications or changes made by those skilled in the art without departing from the spiritual and technical concepts disclosed by the present invention shall still be covered by the claims of the present invention.

The invention claimed is:

1. A bipolar plate, comprising a first polar plate and a second polar plate; wherein, the first polar plate comprises a first side and a second side, and the second polar plate comprises a third side and a fourth side; the first side of the first polar plate is provided with a first flow channel and a first reference plane, and the third side of the second polar plate is provided with a third flow channel and a third reference plane; the first flow channel is a groove formed in a thickness direction relative to the first reference plane, and the third flow channel is a groove formed in the thickness direction relative to the third reference plane; the second side of the first polar plate is provided with a second flow channel and a second reference plane, and the fourth side of the second polar plate is provided with a fourth flow channel and a fourth reference plane; the second flow channel is a groove formed in the thickness direction relative to the second reference plane, and the fourth flow channel is a groove formed in the thickness direction relative to the fourth reference plane; the thickness direction is parallel to a stacking direction of the bipolar plate in a fuel cell stack; in the bipolar plate, the second side of the first polar plate is attached to the fourth side of the second polar plate and a first part of the second reference plane is in contact with a first part of the fourth reference plane; the first flow channel on the first side of the first polar plate comprises a U-shaped segment, and the third flow channel on the third side of the second polar plate does not comprise the U-shaped segment; the U-shaped segment comprises a first segment, a second segment and a third segment; in the fuel cell stack, an included angle formed between a flow direction of a fluid in the first segment and a flow direction of the fluid in the third segment ranges from 150 degrees to 180 degrees, an included angle formed between the flow direction of the fluid in the first segment and a flow direction of the fluid in the second segment ranges from 60 degrees to 120 degrees, and an included angle formed between the flow direction of the fluid in the second segment and the flow direction of the fluid in the third segment ranges from 60 degrees to 120 degrees;

the bipolar plate comprises at least one synchronous undulation area; each synchronous undulation area of the at least one synchronous undulation area is a region on the bipolar plate, and a part of the second flow channel, a second part of the second reference plane, a first part of the fourth flow channel and a second part of the fourth reference plane are located in the each synchronous undulation area, and in the each synchronous undulation area, the second part of the second reference plane is not in contact with the second part of the fourth reference plane.

2. The bipolar plate of claim 1, wherein, the second polar plate is provided with a coolant diversion dike; the coolant diversion dike is a third part of the fourth reference plane formed by blocking a second part of the fourth flow channel.

3. The bipolar plate of claim 2, wherein, the second polar plate is provided with two or more coolant diversion dikes, so that a coolant is guided by the two or more coolant diversion dikes to flow in a space between the first polar plate and the second polar plate in an S shape or a serpentine shape.

4. The bipolar plate of claim 1, wherein, a coolant inlet and a coolant outlet are arranged at two diagonal corners on opposite sides of the bipolar plate, respectively, the coolant inlet and the coolant outlet are interconnected with coolant flow channels respectively corresponding to two synchronous undulation areas of the at least one synchronous undulation area, and the two synchronous undulation areas are located at the two diagonal corners.

5. The bipolar plate of claim 1, wherein, a coolant inlet and a coolant outlet are arranged at adjacent inner corners on a same side of the bipolar plate, respectively, and the coolant inlet and the coolant outlet are interconnected with coolant flow channels respectively corresponding to two synchronous undulation areas of the at least one synchronous undulation area, and the two synchronous undulation areas are located at the adjacent inner corners on the same side.

6. The bipolar plate of claim 1, wherein, the each synchronous undulation area is provided with a plurality of upper support platforms or a plurality of lower support platforms; each of the plurality of upper support platforms is a third part of the second reference plane formed by blocking a part of the second flow channel in the each synchronous undulation area, and each of the plurality of lower support platforms is a fourth part of the fourth reference plane formed by blocking a part of the fourth flow channel in the each synchronous undulation area.

7. The bipolar plate of claim 1, wherein, the first polar plate and the second polar plate are made of a metal thin plate or an alloy thin plate by a pressure processing method, and a thickness of the metal thin plate or the alloy thin plate is less than 0.5 mm.

8. The bipolar plate of claim 1, wherein, the bipolar plate comprises a cross flow area and a parallel flow area, and a projected area of the cross flow area in a fifth reference plane is larger than a projected area of the parallel flow area in the fifth reference plane; the fifth reference plane refers to a plane perpendicular to the thickness direction and the fifth reference plane is a virtual plane;

the cross flow area is a first area on the bipolar plate; in the fuel cell stack, an included angle formed between a flow direction of the fluid in the first flow channel in the cross flow area and a flow direction of the fluid in the third flow channel in the cross flow area ranges from 60 degrees to 120 degrees;

the parallel flow area is a second area on the bipolar plate; in the fuel cell stack, an included angle formed between a flow direction of the fluid in the first flow channel in the parallel flow area and a flow direction of the fluid in the third flow channel in the parallel flow area ranges from 0 degrees to 30 degrees or from 150 degrees to 180 degrees;

the at least one synchronous undulation area on the bipolar plate is located in or overlaps with the parallel flow area.

9. A fuel cell power generation system, comprising a fuel cell stack, wherein, the fuel cell stack comprises the bipolar plate of claim 1.

10. The bipolar plate of claim 1, wherein, the second flow channel in the each synchronous undulation area is a transverse segment of the second flow channel, and the transverse segment is parallel to the second segment of the U-shaped segment in the first flow channel;

the bipolar plate comprises at least two synchronous undulation areas;

the bipolar plate comprises a coolant inlet channel and a coolant outlet channel; the coolant inlet channel is interconnected with a first synchronous undulation area of the at least two synchronous undulation areas, and the coolant outlet channel is interconnected with a second synchronous undulation area of the at least two synchronous undulation areas.

11. A bipolar plate, comprising a first polar plate and a second polar plate; wherein, the first polar plate comprises a first side and a second side, and the second polar plate comprises a third side and a fourth side; the first side of the first polar plate is provided with a first flow channel and a first reference plane, and the third side of the second polar plate is provided with a third flow channel and a third reference plane; the first flow channel is a groove formed in a thickness direction relative to the first reference plane, and the third flow channel is a groove formed in the thickness direction relative to the third reference plane; the second side of the first polar plate is provided with a second flow channel and a second reference plane, and the fourth side of the second polar plate is provided with a fourth flow channel and a fourth reference plane; the second flow channel is a groove formed in the thickness direction relative to the second reference plane, and the fourth flow channel is a groove formed in the thickness direction relative to the fourth reference plane; the thickness direction is parallel to a stacking direction of the bipolar plate in a fuel cell stack; in the bipolar plate, the second side of the first polar plate is attached to the fourth side of the second polar plate and a first part of the second reference plane is in contact with a first part of the fourth reference plane; the first flow channel on the first side of the first polar plate comprises an S-shaped segment, and the third flow channel on the third side of the second polar plate does not comprise the S-shaped segment; the S-shaped segment comprises a fourth segment, a fifth segment and a sixth segment, and a length of the fifth segment is larger than three times a width of the sixth segment; in the fuel cell stack, a fluid flows through the fourth segment, the fifth segment and the sixth segment in turn; an included angle formed between a flow direction of the fluid in the fourth segment and a flow direction of the fluid in the sixth segment ranges from 0 degrees to 30 degrees, an included angle formed between the flow direction of the fluid in the fourth segment and a flow direction of the fluid in the fifth segment ranges from 60 degrees to 120 degrees, and an included angle formed between the flow direction of the fluid in the fifth segment and the flow direction of the fluid in the sixth segment ranges from 60 degrees to 120 degrees;

the bipolar plate comprises at least one synchronous undulation area; each synchronous undulation area of the at least one synchronous undulation area is a region on the bipolar plate, and a part of the second flow channel, a second part of the second reference plane, a first part of the fourth flow channel and a second part of the fourth reference plane are located in the each synchronous undulation area, and in the each synchronous undulation area, the second part of the second reference plane is not in contact with the second part of the fourth reference plane.

12. The bipolar plate of claim 11, wherein, the second polar plate is provided with a coolant diversion dike; the coolant diversion dike is a third part of the fourth reference plane formed by blocking a second part of the fourth flow channel.

13. The bipolar plate of claim 12, wherein, the second polar plate is provided with two or more coolant diversion dikes, so that a coolant is guided by the two or more coolant diversion dikes to flow in a space between the first polar plate and the second polar plate in an S shape or a serpentine shape.

14. The bipolar plate of claim 11, wherein, the each synchronous undulation area is provided with a plurality of upper support platforms or a plurality of lower support platforms; each of the plurality of upper support platforms is a third part of the second reference plane formed by blocking a part of the second flow channel in the each synchronous undulation area, and each of the plurality of lower support platforms is a fourth part of the fourth reference plane formed by blocking a part of the fourth flow channel in the each synchronous undulation area.

15. The bipolar plate of claim 11, wherein, the first polar plate and the second polar plate are made of a metal thin plate or an alloy thin plate by a pressure processing method, and a thickness of the metal thin plate or the alloy thin plate is less than 0.5 mm.

16. The bipolar plate of claim 11, wherein, the bipolar plate comprises a cross flow area and a parallel flow area, and a projected area of the cross flow area in a fifth reference plane is larger than a projected area of the parallel flow area in the fifth reference plane; the fifth reference plane refers to a plane perpendicular to the thickness direction and the fifth reference plane is a virtual plane;

the cross flow area is a first area on the bipolar plate; in the fuel cell stack, an included angle formed between a flow direction of the fluid in the first flow channel in the cross flow area and a flow direction of the fluid in the third flow channel in the cross flow area ranges from 60 degrees to 120 degrees;

the parallel flow area is a second area on the bipolar plate; in the fuel cell stack, an included angle formed between a flow direction of the fluid in the first flow channel in the parallel flow area and a flow direction of the fluid in the third flow channel in the parallel flow area ranges from 0 degrees to 30 degrees or from 150 degrees to 180 degrees;

the at least one synchronous undulation area on the bipolar plate is located in or overlaps with the parallel flow area.

17. The bipolar plate of claim 11, wherein, the second flow channel in the each synchronous undulation area is a transverse segment of the second flow channel, and the transverse segment is parallel to the fifth segment of the S-shaped segment in the first flow channel;

the bipolar plate comprises at least two synchronous undulation areas;

the bipolar plate comprises a coolant inlet channel and a coolant outlet channel; the coolant inlet channel is interconnected with a first synchronous undulation area of the at least two synchronous undulation areas, and the coolant outlet channel is interconnected with a second synchronous undulation area of the at least two synchronous undulation areas.

* * * * *

UNITED STATES PATENT AND TRADEMARK OFFICE
CERTIFICATE OF CORRECTION

PATENT NO. : 11,289,716 B2  
APPLICATION NO. : 16/856062  
DATED : March 29, 2022  
INVENTOR(S) : Zhang et al.

Page 1 of 1

It is certified that error appears in the above-identified patent and that said Letters Patent is hereby corrected as shown below:

On the Title Page

Item (73) Assignees should read Guosheng Zhang, Beijing (CN); Zhijin Zhang, Beijing (CN); Ruiping Niu, Beijing (CN); Wenming Zhang, Jiaozuo (CN)

Signed and Sealed this  
Twenty-first Day of June, 2022

Katherine Kelly Vidal  
*Director of the United States Patent and Trademark Office*